(12) United States Patent
Presz, Jr. et al.

(10) Patent No.: US 6,311,928 B1
(45) Date of Patent: Nov. 6, 2001

(54) JET ENGINE CASCADE THRUST REVERSER FOR USE WITH MIXER/EJECTOR NOISE SUPPRESSOR

(75) Inventors: Walter M. Presz, Jr., Wilbraham, MA (US); Maurice C. Butler, Encinitas; Jack H. Anderson, La Jolla, both of CA (US)

(73) Assignee: Stage III Technologies, L.C., Las Vegas, NV (US)

( * ) Notice: Subject to any disclaimer, the term of this patent is extended or adjusted under 35 U.S.C. 154(b) by 0 days.

(21) Appl. No.: 09/477,849

(22) Filed: Jan. 5, 2000

(51) Int. Cl.[7] .............................. B64C 25/68; B64F 1/12; F02K 1/00; B05B 12/00
(52) U.S. Cl. .................. 244/110 B; 244/12.5; 60/230; 239/265.29; 239/265.31
(58) Field of Search .................. 60/226.2, 230; 239/265.27, 265.29, 265.25, 265.31; 244/110 B, 12.5

(56) References Cited

U.S. PATENT DOCUMENTS

| | | | |
|---|---|---|---|
| 3,614,037 | * 10/1971 | Vdolek | 244/110 B |
| 3,616,648 | 11/1971 | Weise | 239/265.31 |
| 3,734,411 | 5/1973 | Wolf et al. | 239/265.29 |
| 4,410,152 | * 10/1983 | Kennedy et al. | 239/265.27 |
| 4,760,960 | 8/1988 | Ward et al. | 60/230 |
| 4,790,495 | 12/1988 | Greathouse et al. | 244/110 B |
| 4,798,328 | 1/1989 | Thayer et al. | 239/1 |
| 4,807,434 | 2/1989 | Jurich | 60/226.2 |
| 5,203,164 | 4/1993 | Paulson | 60/226.1 |
| 5,396,762 | 3/1995 | Standish | 60/226.2 |
| 5,493,856 | 2/1996 | Newton | 60/226.2 |
| 5,507,143 | 4/1996 | Luttgeharm et al. | 60/226.2 |
| 5,548,954 | 8/1996 | de Cambray et al. | 60/226.2 |
| 5,598,701 | 2/1997 | Newton | 60/226.2 |
| 5,794,434 | 8/1998 | Imre A.Szupkay | 60/226.2 |
| 5,819,528 | 10/1998 | Masson | 60/226.2 |
| 5,863,014 | * 1/1999 | Standish | 244/110 B |
| 5,983,625 | 11/1999 | Gonidec et al. | 60/226.2 |
| 5,987,880 | * 11/1999 | Culbertson | 60/226.2 |
| 6,094,908 | * 8/2000 | Baudu et al. | 60/226.2 |

* cited by examiner

*Primary Examiner*—Charles T. Jordan
*Assistant Examiner*—Christian M. Best
(74) *Attorney, Agent, or Firm*—Holland & Bonzagni, P.C.

(57) ABSTRACT

A cascade thrust reverser for use with a mixer/ejector noise suppressor has a set of internal blocker doors controllably moveable between a stowed position, where engine exhaust passes through and out the tailpipe, and a deployed position, where engine exhaust is blocked and redirected out a pair of cascades or louvers. External cascade doors cover the cascades from the outside during flight, but are moved aft, exposing the cascades, when the blocker doors are deployed subsequent landing. In a preferred embodiment, the cascade doors and the blocker doors are interconnected through a pair of actuation mechanisms, whereby movement of the cascade doors is sequenced to the motion of the blocker doors. The blocker doors and the cascade doors are shaped to provide a clean aerodynamic profile when stowed, so that the noise suppressor functions optimally. The actuation mechanisms also preferably include lock mechanisms for only allowing the thrust reversers to be deployed just subsequent landing. Also, the thrust reverser can directly replace one of an airplane's existing thrust reversers without any modifications to the plane's hydraulic system or controls or instrumentation.

31 Claims, 22 Drawing Sheets

JET ENGINE CASCADE THRUST REVERSER FOR USE WITH MIXER/EJECTOR NOISE SUPPRESSOR

FIELD OF THE INVENTION

The present invention relates to jet engines, and, more particularly, to jet engine thrust reverser mechanisms.

BACKGROUND OF THE INVENTION

A thrust reverser is a mechanical device that is deployed to redirect exhaust flow from one of an aircraft's gas turbine engines, typically just subsequent to the aircraft landing. Thrust reversers are normally deployed during the landing sequence, after the nose wheel has touched down (usually called the "rollout"). Thrust reversers can greatly reduce the length of runway necessary to bring the aircraft to taxi speed, and they are also used when adverse weather conditions, such as ice on the runway, may cause the aircraft's brakes to be ineffective.

There are two basic types of thrust reversers, the "pre-exit", and the "postexit." Schematics of both of these designs are shown in FIGS. 1A–3B. The post-exit reverser, as illustrated in FIGS. 1A and 1B, is seen to redirect the engine exhaust jet after it leaves the engine's tailpipe. Pre-exit reversers, as illustrated in FIGS..2A, 2B, 3A and 3B, turn the flow in the exhaust tailpipe before it is expanded to ambient. Thus, the pre-exit reverser generates lower forces on the blocker doors. In the actuated-mode, the pre-exit reverser is aerodynamically cleaner, and could be actuated in flight with minimal drag effects, e.g., as a result of inadvertent actuation.

Many older jet engines, such as the Spey® 511-8 turbofan engines manufactured by Rolls Royce Ltd., have post-exit thrust reversers, as shown in FIGS. 1A and 1B. There, the engine exhaust jet exits the engine nozzle, hits the reverser buckets and is redirected in the forward direction, as indicated by the directional flow arrows. The reverser is used to redirect about 12,000 pounds of thrust generated from the engine with a jet velocity of approximately 1900 ft/sec. The loads on the buckets, and the linkages actuating the buckets, are extremely large. Also, the effectiveness of the reverser is limited to the ability of the buckets by themselves to turn the flow. Post-exit reversers of this type tend to be much less effective than pre-exit reversers. Also, in-flight actuation of such bucket reversers can cause catastrophic drag and jet forces on the aircraft.

Although these older, post-exit thrust reverser jet engines are functional, the engines produce excessive amounts of noise. This is because the engines have low bypass ratios and extremely high jet velocities. In low bypass ratio turbofan engines, most of the energy from the burnt fuel is used to raise the pressure and temperature of the engine flow. Engine and fan streams are usually mixed and exhausted through a common nozzle. This results in high nozzle pressure ratios, high jet velocities, and high levels of noise. In fact, planes carrying these engines, such as the common business-class Gulfstream® GII, GIIB, and GIII, typically violate the federal "stage three" jet engine noise requirements, which are the latest United States government standards imposed to reduce noise pollution around major urban areas.

As a result, a Two Stage Mixer/Ejector Concept (TSMEC™) noise suppressor was originally formulated, analyzed and proposed as a possible solution to the Gulfstream® GII/GIIB/GIII aircraft jet noise problem. The TSMEC™ noise suppressor is set forth in U.S. Pat. No. 5,761,900 to Presz, Jr.

Basically, the TSMEC™ noise suppressor comprises a lobed ejector shroud coupled to a lobed mixer. Engine exhaust passes out the engine proper, through the lobed mixer, and into the ejector shroud. At the same time, cooler, lower velocity, ambient air outside the engine passes over the lobed mixer to enter the ejector shroud via spaces between the shroud and mixer. The lobed mixer causes the ambient air to quickly mix with the engine exhaust, creating a uniform flow by the time the combined gasses exit the ejector shroud, and, furthermore, cooling and slowing the engine exhaust. This lowers the engine's noise output.

An improved version of the TSMEC™ noise suppressor, called an Alternating Lobed Mixer/Ejector Concept (ALMEC™) suppressor, is described in U.S. Pat. No. 5,884,772 to Presz, Jr. et al. ("the '772 patent"), the entirety of which is hereby incorporated by reference. The ALMEC™ suppressor has alternating, deep penetrating lobes that provide significantly larger jet noise reduction than the original TSMEC™ design.

FIGS. 10–12 in the '772 patent show schematics of the various ALMEC™ suppressor components. Like the TSMEC™ suppressor, the ALMEC™ noise suppressor mixes cool ambient air with the hot, high velocity engine flow before it leaves the exhaust system. In this manner, the resulting exhaust jet is at a much lower velocity and temperature. The lower jet velocities provide the noise reduction needed to satisfy federal stage three requirements.

The ALMEC™ suppressor has two major components: the mixer nozzle and the ejector shroud. The mixer nozzle has ten lobes designed to efficiently and rapidly mix the engine flow with ejector secondary air. Five of the lobes are shallow; and they are designed identically to the TSMEC™ nozzle lobes. The other five lobes are much longer; and they are designed to penetrate deeply into the hot engine jet core. The shallow and deep lobes alternate around the circumference of the nozzle. The alternating lobes set up separate axial vorticity patterns that interact with each other to enhance mixing and further reduce noise.

The TSMEC™ and ALMEC™ noise suppressors are available from the common assignee of this application and the above mentioned patents, Stage III Technologies, L.C. of Las Vegas, Nev.

As should be appreciated, both the TSMEC™ and the ALMEC™ noise suppressors need to be attached to the exit end of a jet engine to function. Therefore, one major problem associated with outfitting the Gulfstream® GII, GIIB, and GIII (and similar) aircraft with these noise suppressors is that the noise suppressor assemblies would have to be affixed to the engines in roughly the same spaces occupied by the engines' post-exit thrust reversers. Of course, this is impossible.

Moreover, even if it were mechanically possible to use the existing, post-exit thrust reversers with the ALMEC™ or TSMEC™ noise suppressors, the post-exit reversers would be aerodynamically compatible with neither. As described above, both noise suppressors work by entrainment, sucking ambient air (that flows over the engine nacelle after body) into the ejector shroud. The mixer nozzle lobes mix this ambient air with the higher velocity engine exhaust to generate a lower velocity, quieter exhaust jet. With a post-exit thrust reverser, the flow disturbances caused by the stowed buckets could significantly affect the nearby ambient flow and consequently hinder suppressor performance. More specifically, the current engine nacelle after body closes at an angle near fifteen degrees. This means that the flow boundary layer on the nacelle after body is very close to separating (separation means the flow leaves the after body and nozzle lobe surface). In fact, any surface disturbance, such as that caused by the bucket doors, or even exposed cascade vanes, could cause the after body flow to separate. Such flow separation would cause high losses, poor mixing, and less flow to enter the ejector shroud. The net result would make the ALMEC™ and TSMEC™ suppressors less effective.

Because post-exit thrust reversers are not compatible with the ALMEC™ suppressors (or other, similar-type noise suppressors), a pre-exit thrust reverser must be used instead. While several such reversers are available, as described below, they were not found to be advantageous for use with mixer/ejector noise suppressors like the ALMEC™. More specifically, existing pre-exit thrust reversers are unnecessarily mechanically complex, are still prone to accidental deployment, are not aerodynamically compatible with mixer/ejector noise suppressors, and would require modifications to an airplane's hydraulic or instrumentation systems.

For example, U.S. Pat. No. 4,790,495 to Greathouse et al. discloses a cascade thrust reverser with a pair of internal blocker doors deployable for redirecting engine thrust through a pair of cascades or louvers. Neither doors for covering the cascades from the outside, nor a mechanism for attaching or closing such doors, are provided. The cascades remain open to the air flow over the engine nacelle at all times. This would greatly reduce the effectiveness of a mixer/ejector noise suppressor attached to such an engine. Moreover, the design in Greathouse et al. requires the use of latching solenoids and associated electric control circuitry, requiring extensive modifications to the airplane's existing controls.

Additionally, U.S. Pat. No. 3,734,411 to Wolf et al discloses another cascade thrust reverser. There, numerous components of the reverser mechanism interfere with the exhaust flow traveling through the tailpipe. For example, a plurality of reverser mechanism linkage arms lie internal to (or at least exposed to) the tailpipe bore, which is also apparently traversed by a shaft used to support the blocker doors. Although this would be acceptable for regular, noisy jet engines, it would significantly interfere with the proper functioning of a mixer/ejector noise suppressor, like TSMEC™ or ALMEC™.

U.S. Pat. No. 3,616,648 to Weise also discloses a cascade thrust reverser. As with Wolf et al, some of the reverser's components lie exposed or internal to the tailpipe bore. Also, the entire rear portion of the nacelle, in the form of an annular cowl supporting the cascades and blocker door assembly, must be moved aft to actuate the thrust reverser. This arrangement is somewhat mechanically precarious. The cowling would likely be unable to physically support a mixer/ejector noise suppressor attached to it.

Finally, U.S. Pat. No. 5,598,701 to Newton discloses a "door-type" thrust reverser (see FIGS. 3A and 3B). There, aft ends of the blocker doors and external doors are supported by a frangible coupling designed to break upon accidental deployment during flight. In this design, blocker door actuation arm tracks are open to the tailpipe bore, and there is no place to attach a noise suppressor (note that extending the outer nacelle housing further aft could potentially interfere with the safety mechanism).

Accordingly, it is a primary object of the present invention to provide a unique, pre-exit cascade thrust reverser compatible for use with a mixer/ejector jet engine noise suppressor.

A more specific object is to provide a pre-exit thrust reverser that includes a safety mechanism that prevents inadvertent deployment of the thrust reverser at any times except subsequent landing.

Yet another object of the present invention is to provide a unique thrust reverser, commensurate with the above-listed objects, that is directly compatible with a jet airplane's existing hydraulic and instrumentation system, such that no "upstream" modifications are required.

Yet another object of the present invention is to provide a thrust reverser that is as light or lighter than existing thrust reversers, thereby ensuring no flight performance penalties.

Still another object of the present invention is to provide a thrust reverser that is specifically aerodynamically compatible with the patented ALMEC™ noise suppressor.

SUMMARY OF THE INVENTION

In order to solve the aforementioned problems and meet the stated objects, the present invention discloses a pre-exit, cascade thrust reverser for an aircraft jet engine that is compatible with mixer/ejector noise suppressors and that has an improved mechanical operation system. The thrust reverser, essentially a tailpipe frame carrying a thrust reverser assembly, replaces a jet engine's existing tailpipe, and eliminates the external, post-exit bucket assembly typically found on many older jet engines. This allows a noise suppressor assembly to be affixed to the end of the tailpipe/thrust reverser.

The thrust reverser is a pre-exit, cascade-type reverser, wherein a set of internal, arcuate blocker doors are controllably moveable between an open or stowed position, where engine exhaust passes through and out the tailpipe, and a closed or deployed position, where engine exhaust is blocked and redirected out a pair of cascades or louvers. External cascade doors cover the cascades from the outside during flight, but are moved aft, exposing the cascades, when the thrust reverser blocker doors are deployed subsequent landing. The movement of these doors is sequenced to the motion of the internal blocker doors.

In the preferred embodiment, at the core of the thrust reverser is a hollow cylindrical tailpipe frame. The blocker and cascade doors are actuated via a pair of hydraulically powered actuation mechanisms, one on either side of the frame. Each actuation mechanism includes a set of levers rotatably or pivotally connected to a hinge shaft assembly. The levers are connected to the cascade doors via swing arm assemblies, and are also connected to the blocker doors through the hinge shaft assemblies (which extend through the frame). When the actuation mechanisms are actuated in unison, the levers are pivoted. This in turn causes the blocker doors to pivot aft, thereby uncovering the cascades from the inside, and also causes the swing arm assemblies to swing the cascade doors out and aft, thereby uncovering the cascades from the outside. With the cascades uncovered and the blocker doors blocking the frame interior, engine exhaust strikes the blocker doors and is directed out and forward through the cascades.

Associated with each of the preferred actuation mechanisms is a locking mechanism, which inhibits inadvertent deployment of the thrust reverser. Each locking mechanism includes a hydraulic cylinder and a lock pawl operably connected thereto. The lock pawls are moveable between a locking engagement position preventing the actuation mechanisms from rotating, and a disengaged or unlocked position. The hydraulic cylinders are configured to only move the lock pawls to the unlocked position when the airplane's hydraulic pressure is above a minimum increased landing level. Thus, the trust reversers only become unlocked when the plane is landing, and cannot be deployed (deliberately or otherwise) during flight. Additionally, the lock pawl hydraulic cylinders are connected in hydraulic series with the actuation mechanisms' main hydraulic cylinders, further ensuring that the actuation mechanisms can only deploy the thrust reverser subsequent to the lock pawls being disengaged subsequent to the aircraft landing.

Both the blocker doors and the external cascade doors, as well as the surrounding framework, are designed to provide aerodynamically clean, nonintrusive surfaces when the thrust reverser is stowed, thereby facilitating optimal noise suppressor performance. For example, when stowed, the cascade doors lie even with the outer tailpipe or nacelle paneling, as do the blocker doors with respect to the inner tailpipe walls.

BRIEF DESCRIPTION OF THE DRAWINGS

These and other features, aspects, and advantages of the present invention will become better understood with respect to the following description, appended claims, and accompanying drawings, in which:

DETAILED DESCRIPTION OF THE PREFERRED EMBODIMENT

Figure 3A:
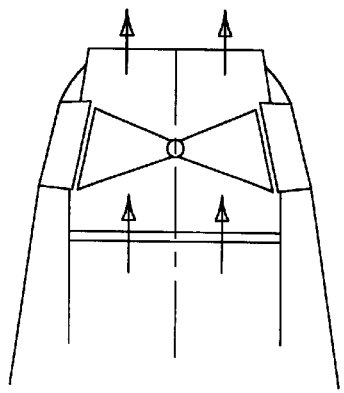
FIGS. 3A and 3B are schematic side views of a second prior art, pre-exit thrust reverser in a stowed and a deployed position, respectively.
Figure 3B:
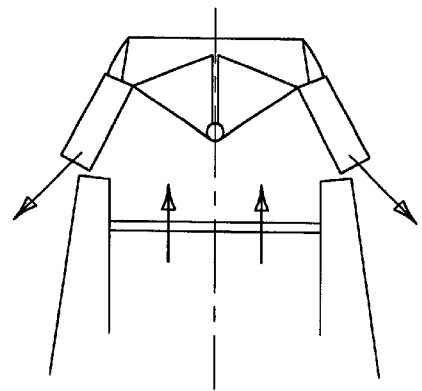
Figure 2A:
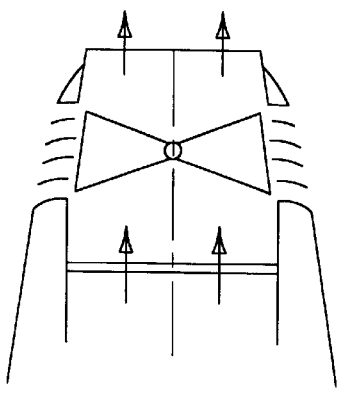
FIGS. 2A and 2B are schematic side views of a prior art, pre-exit thrust reverser in a stowed and a deployed position, respectively.
Figure 2B:
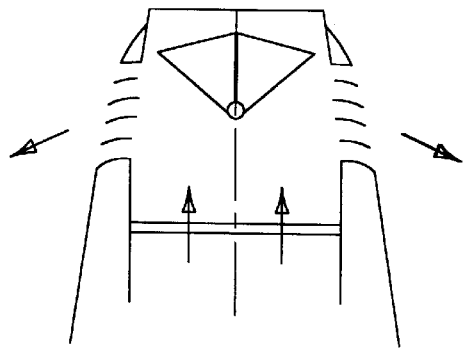
Figure 1A:
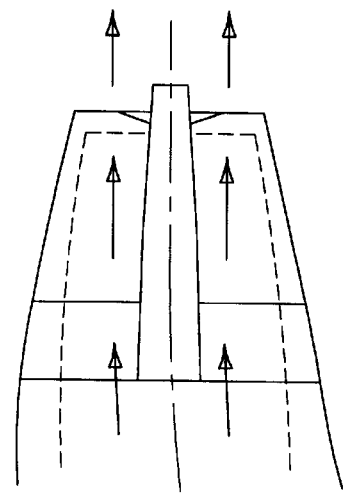
FIGS. 1A and 1B are schematic side views of a prior art, post-exit thrust reverser in a stowed and a deployed position, respectively.
Figure 1B:
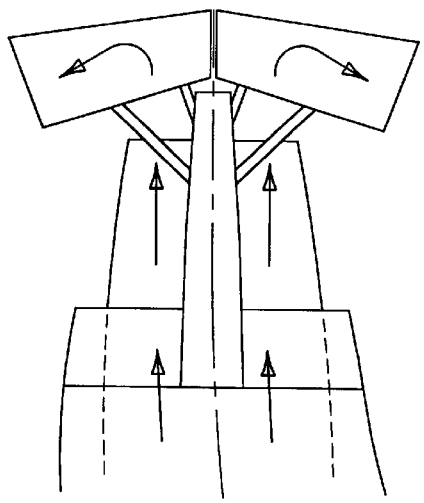

Turning now to FIGS. 4A–26B, a preferred embodiment of a cascade thrust reverser, according to the present invention, will now be given. By "cascade," it is meant that the present invention relates to thrust reversers of the type generally shown in FIGS. 2A–2B which use louvers ("cascades") to help redirect engine thrust.

Figure 4A:
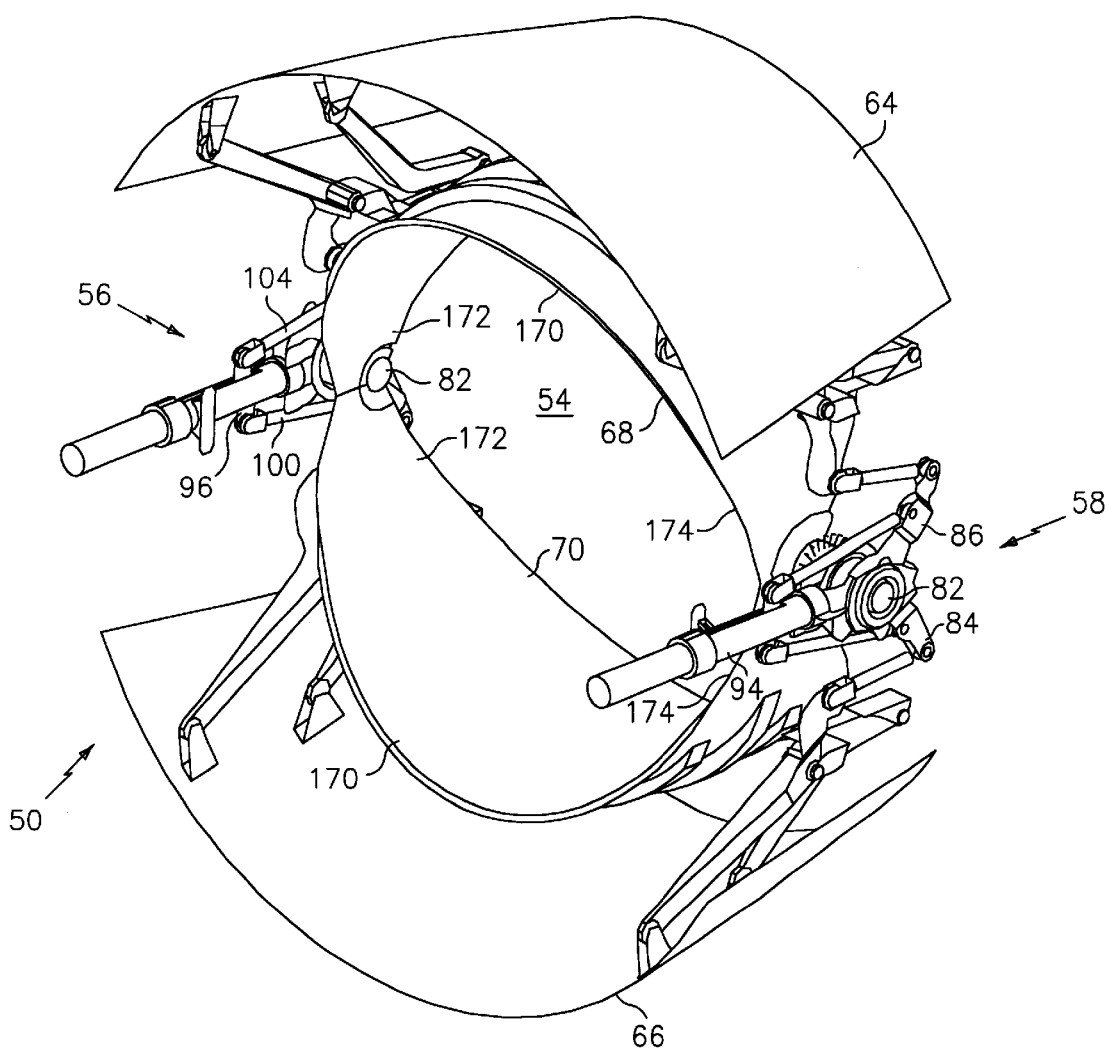
FIGS. 4A–4C are top right perspective views of a thrust reverser according to the present invention, in simplified skeletal form, in a stowed position, a partly deployed position, and a fully deployed position, respectively.
Figure 4B:
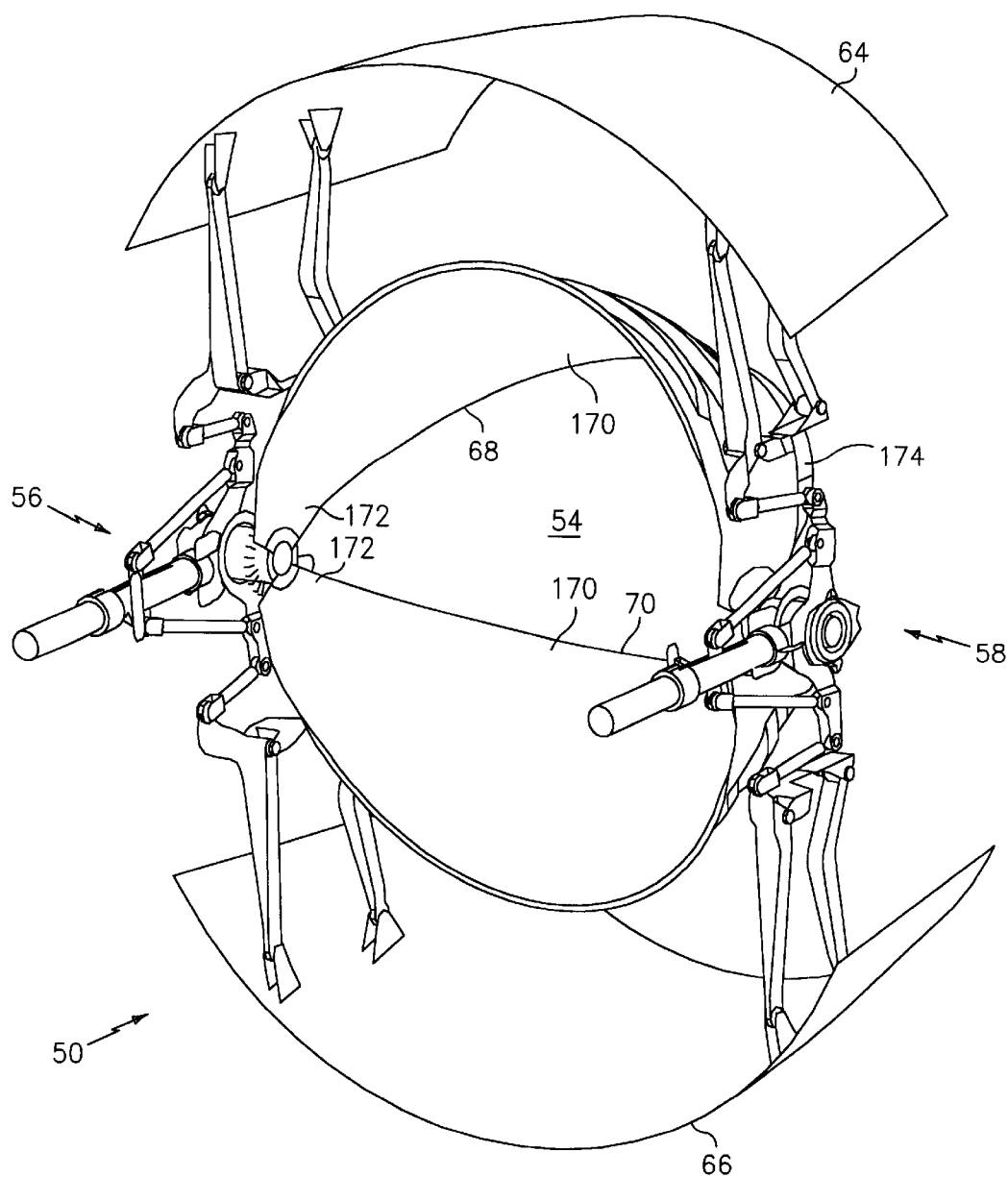
Figure 4C:
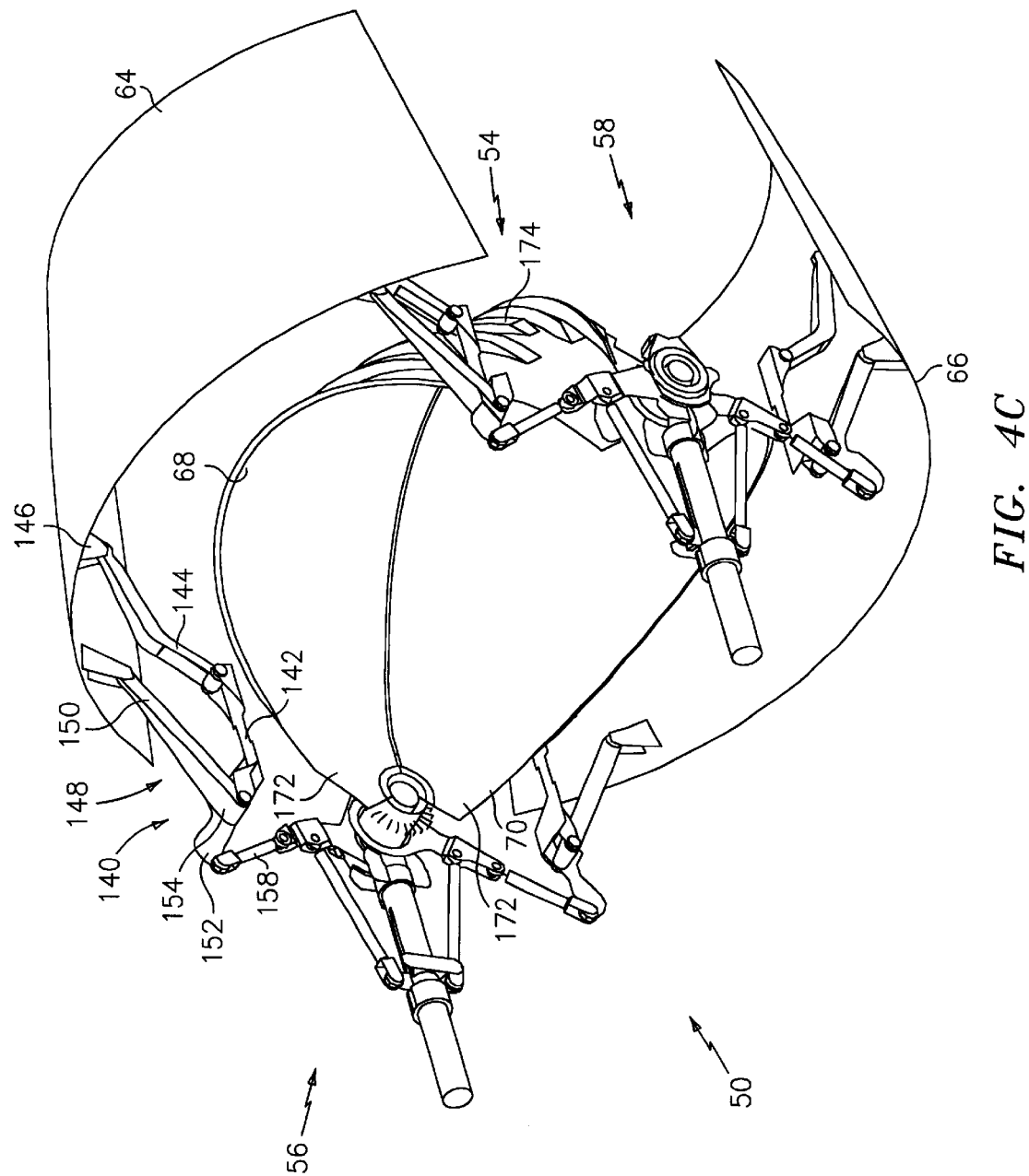

The basic structure and operation of the cascade thrust reverser 50 is shown in FIGS. 4A–4C. At the core of the reverser 50 is a tailpipe frame 52 (see FIG. 8), which has an axial bore 54 therein and which supports and holds the remaining components. Inboard and outboard hydraulically powered actuation mechanisms 56, 58 are affixed to inboard and outboard external sides of the frame 52, respectively. Additionally, the frame 52 holds upper and lower cascades 60, 62 (not shown), which provide directed conduits from the bore 54 to external the frame 52. Upper and lower external cascade doors 64, 66 are each pivotally or swingably connected to the frame 52, and each is further connected to the actuation mechanisms for controllably covering the upper and lower cascades 60, 62, respectively. Finally, upper and lower blocker doors 68, 70, internal to the frame 52, are also connected to the actuation mechanisms 56, 58 through the frame 52. The actuation mechanisms 56, 58 deploy (or stow) the cascade doors 64, 66 concurrently with deploying (or stowing) the blocker doors 68, 70.

Note that for purposes of being able to see all the main components, the frame 52 and the cascades 60, 62 are not shown in FIGS. 4A–4C. However, it should be appreciated that the frame 52 would generally partially occupy the cylindrical space between the blocker doors 68, 70 and the cascade doors 64, 66 and actuation mechanisms 56, 58, and the cascades 60,62 would occupy part of the space between the blocker doors and cascade doors.

In FIG. 4A, where the reverser 50 is shown in a stowed position, the cascade doors 64, 66 cover the cascades 60, 62 from the outside. Additionally, the blocker doors 68, 70 lie up against an internal wall 72 of the frame 52 and cover the cascades 60, 62 from the inside. When the actuation mechanisms 56, 58 are hydraulically actuated they cause the cascade doors 64, 66 to swing out and aft, as shown in FIG. 4B. At the same time, the actuation mechanisms cause the blocker doors 68, 70 to pivot rearwards. Finally, in a fully deployed position, as shown in FIG. 4C, the cascades 60, 62 are fully uncovered, and the blocker doors 68, 70 at least substantially block the axial bore 54 of the tailpipe frame 52 so as to redirect engine thrust up and through the cascades 60, 62.

Figure 5:
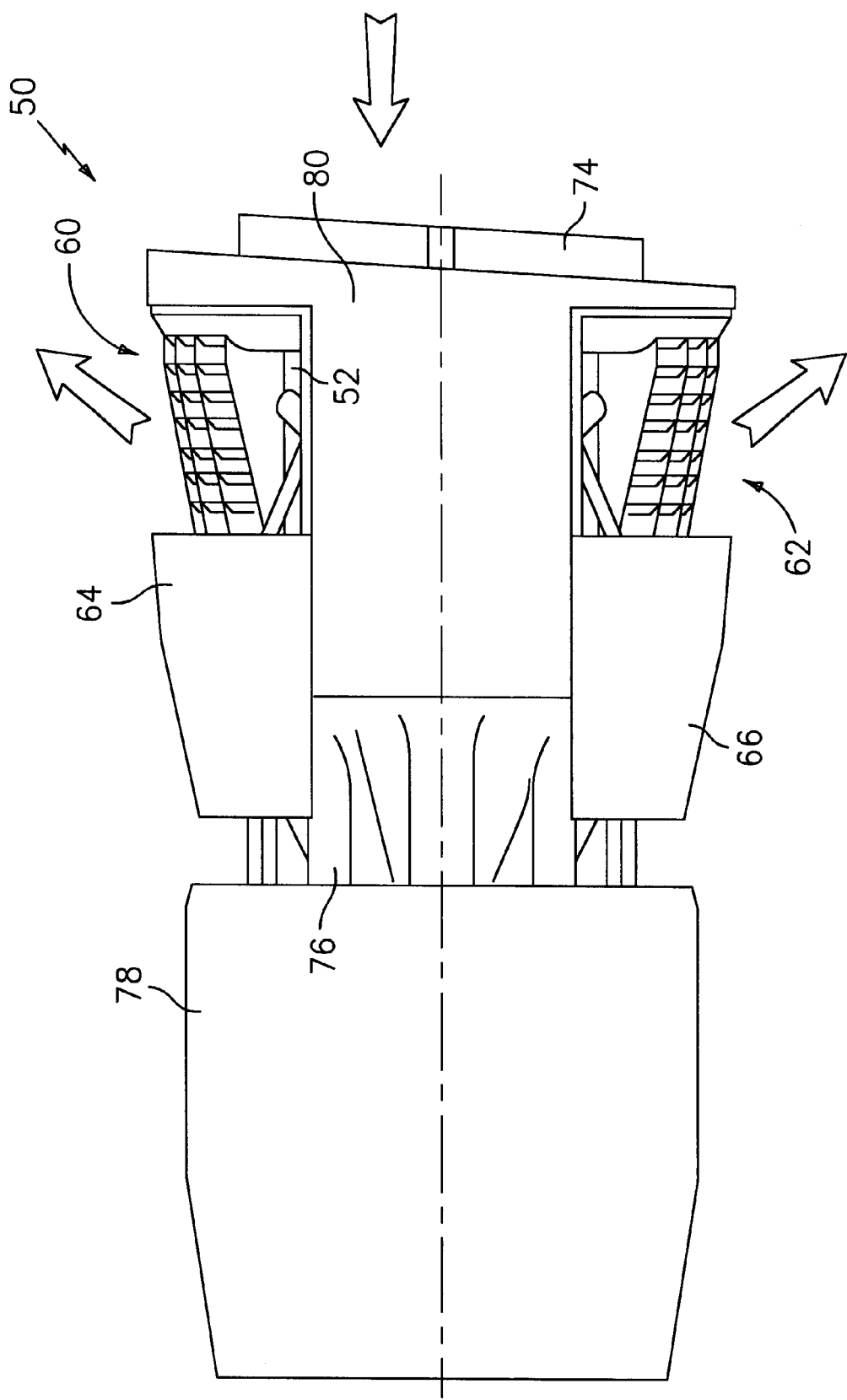
FIG. 5 is a side perspective view of the thrust reverser as part of a mixer/ejector noise suppressor system.

To put the present invention in context, an overview of the cascade thrust reverser 50 as part of a mixer/ejector noise suppressor system (e.g., the ALMEC™) is shown in FIG. 5. There, the thrust reverser 50 replaces a conventional tailpipe portion of a jet engine (e.g., the Spey® 511-8 jet engine; not shown), which would lie upstream or to the fore of the reverser 50 (to the right in FIG. 5). As used herein (and as is conventional), "fore" refers to the general direction of the front of the aircraft, and "aft" to the rear. The reverser 50 is connected to the rear of the jet engine via conventional means, such as welding of an annular attachment flange 74. Furthermore, a lobed mixing ring 76 is attached to the downstream end of the thrust reverser 50, and a cylindrical, axially hollow ejector shroud 78 is attached to the lobed mixing ring 76.

In FIG. 5, the reverser 50 is shown in its deployed position, with the cascade doors 64, 66 having been swung out and aft by the actuation mechanisms 56, 58 (not shown) to uncover the cascades 60, 62. Also, the internal blocker doors 68, 70 (not shown) have been pivoted by the actuation mechanisms to block the tailpipe bore 54 (not shown). This redirects engine thrust through the cascades 60, 62 (and against the direction the plane would be moving down the runway), as indicated by the directional arrows.

If the reverser 50 in FIG. 5 was in its stowed position, as in FIG. 4A, engine thrust would pass down through the tailpipe bore 54, between the open blocker doors 68, 70, through the mixer ring 76, and through and out the ejector shroud 78. At the same time, external, ambient air would enter the ejector shroud 78 via the gaps formed between where the lobed mixer ring 76 is connected to the shroud 78. Note that if the cascade doors 64, 66 were stowed, they would fit cleanly into an outer casing 80 of the tailpipe or nacelle, which would thereby be aerodynamically clean (as further described below). This would ensure that the lower velocity, cooler ambient air would pass properly over the mixing ring 76 to enter the ejector shroud 78 and thereby mix with the hotter, higher velocity engine thrust therein. Thus, both the temperature and velocity of the engine exhaust exiting the shroud 78 would be reduced, thereby significantly reducing the low frequency noise produced by the engine. Additional information about this process, the mixing ring 76, and the shroud 78 can be found in the '772 patent.

Further detail regarding the operation of the reverser 50 and the components thereof will now be given with reference to FIGS. 6–26B.

Figure 6:
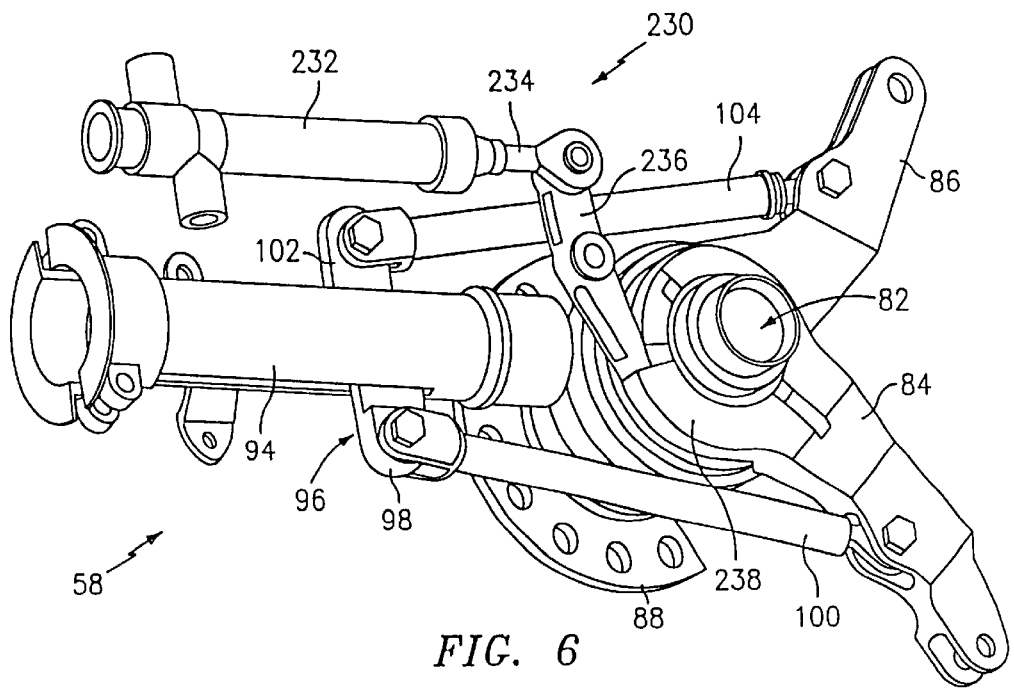
FIG. 6 is a simplified perspective view of an outboard thrust reverser actuation mechanism according to the present invention.
Figure 7:
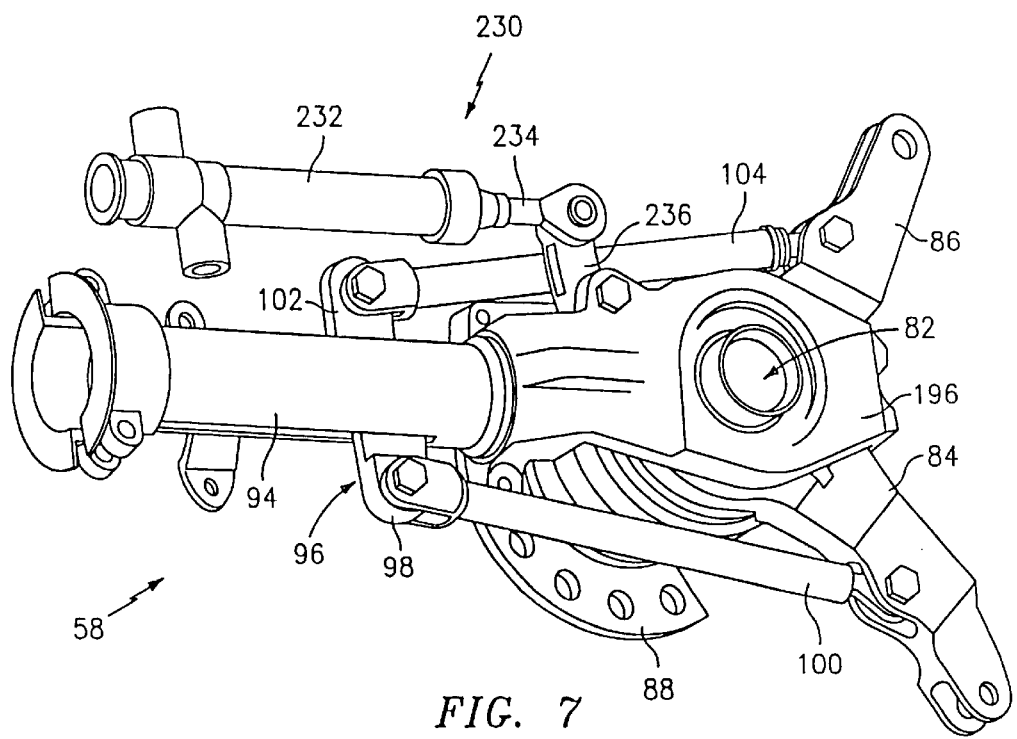
FIG. 7 is another simplified perspective view of the outboard actuation mechanism.

FIGS. 6 and 7 show perspective views of the outboard actuation mechanism 8 (note that inboard mechanism 56 is similar to the outboard mechanism 58, save that the former includes a throttle feedback mechanism 250, as discussed further below). At the heart of the actuation mechanism 58 is a hinge shaft assembly 82 (roughly cylindrical in shape), which rotatably supports an inner lever 84 and an outer lever 86 proximate a first end of the hinge shaft assembly 82. A first blocker door attachment flange 88 is located proximate the other end of the hinge shaft assembly 82, and is connected to the inner lever 84 through the hinge shaft assembly 82. Thus, when the inner lever 84 rotates about the hinge shaft assembly 82, the first attachment flange 88 also rotates. A second attachment flange 90 (not shown here) is likewise connected to the outer lever 86. The outboard actuation mechanism 58 is hydraulically powered via a hydraulic cylinder 92 (see FIG. 19) carried in and supported by a main hydraulic actuator support guide 94. The hydraulic cylinder 92 controllably slides a traverse beam 96 up and down a portion of the support guide's length. The inner lever 84 is pivotally connected to a first end 98 of the traverse beam 96 via a first long push/pull rod 100, and the outer lever 86 is likewise pivotally connected to a second end 102 of the traverse beam 96 via a second long push-pull rod 104. Since the inner lever 84 lies above the outer lever 86 on the hinge shaft assembly 82, the first end 98 of the traverse beam 96 has a raised portion so that the first push/pull rod 100 generally lies in the same plane as the inner lever 84.

Figure 8:
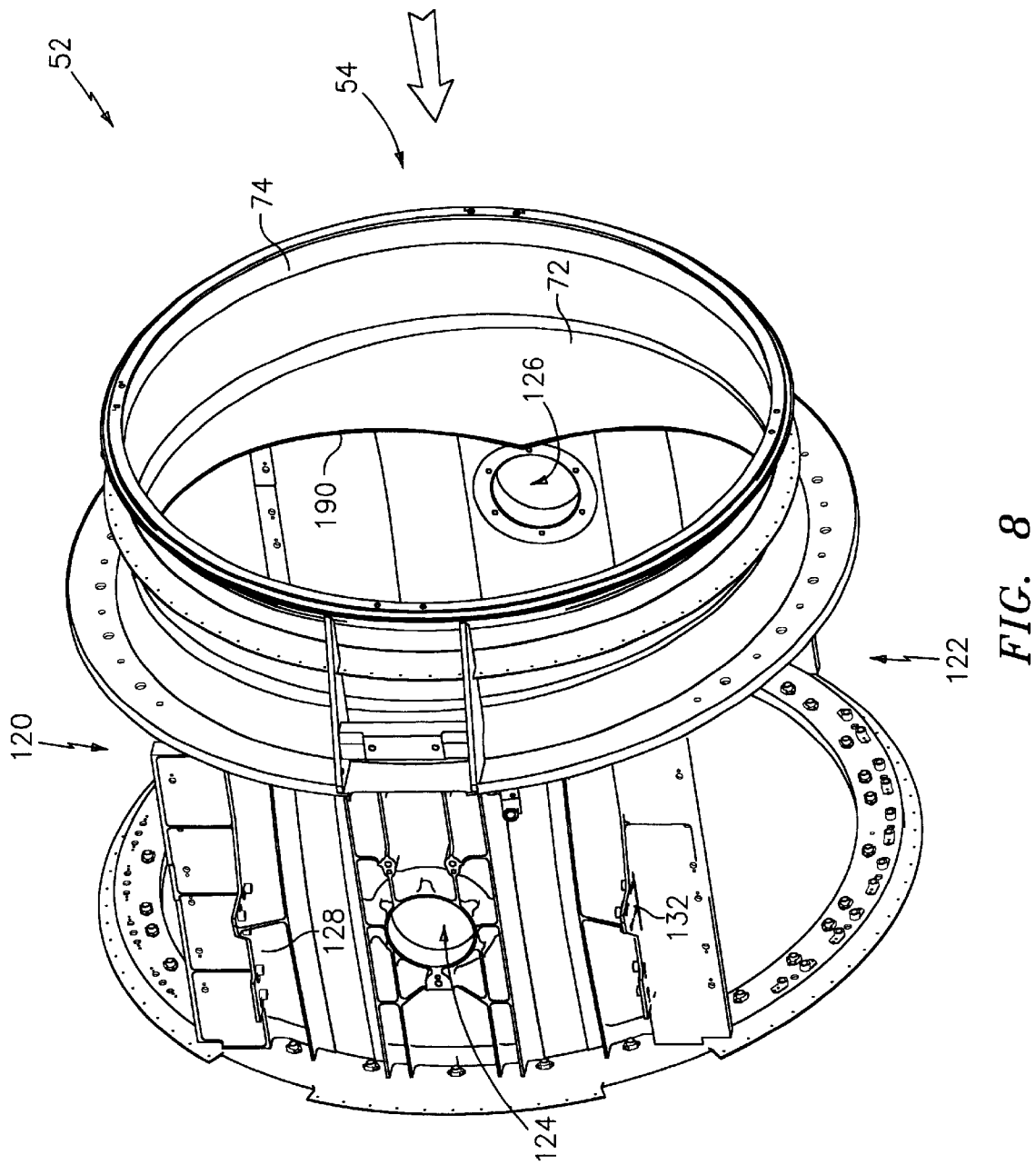
FIG. 8 is a perspective view of a tailpipe/thrust reverser frame.

FIG. 8 shows the tailpipe or thrust reverser frame 52 which holds and supports the other components of the thrust reverser 50, as well as the components of the mixer/ejector noise suppressor system. As mentioned above, the frame 52 is meant to replace a jet engine's existing tailpipe.

The frame 52, as can be seen, is longitudinally hollow and generally cylindrical in overall shape. The frame 52 includes: top and bottom cascade openings 120, 122 (across which the upper and lower cascades 60, 62 are dimensioned to fit); inboard and outboard frame sides that define inboard and outboard actuation mechanism through holes 124, 126, respectively; inboard and outboard upper cascade door swing assembly attachment flanges 128, 130 (only the inboard flange is shown); and inboard and outboard lower cascade door swing assembly attachment flanges 132, 134 (again, only the inboard flange is shown here).

Figure 9:
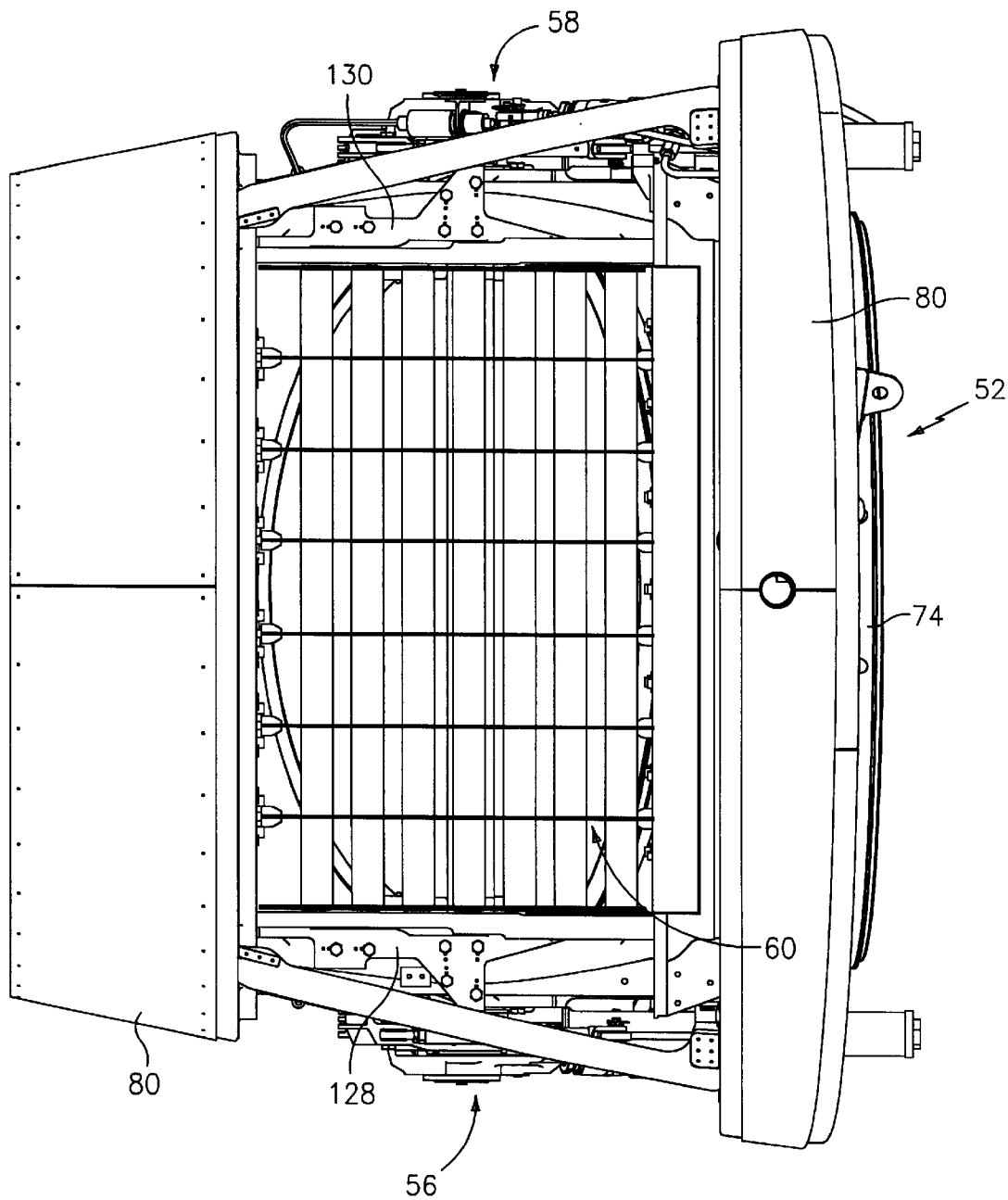
FIG. 9 is a top down view of the thrust reverser without an upper cascade door.

FIG. 9 shows the frame 52 after the upper cascade 60 has been affixed to the frame 52 across the top cascade opening 120. As mentioned above, and as shown in this and the other views, the upper cascade 60 (as well as the lower cascade 62) is a louver, which in this case means a set of curved slats fixed in place by a series of generally parallel cross-braces. The slats help direct engine thrust forward when the thrust reverser is deployed, and the cross-braces keep the slats in place while providing a minimal aerodynamic profile.

Figure 13A:
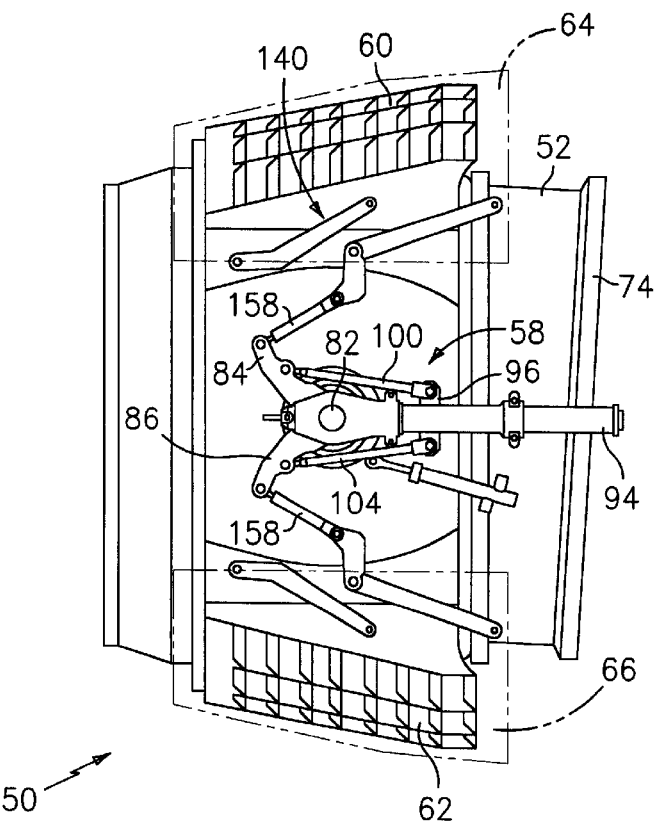
FIGS. 13A and 13B are simplified side views showing the complete thrust reverser in the stowed and the deployed position, respectively.
Figure 13B:
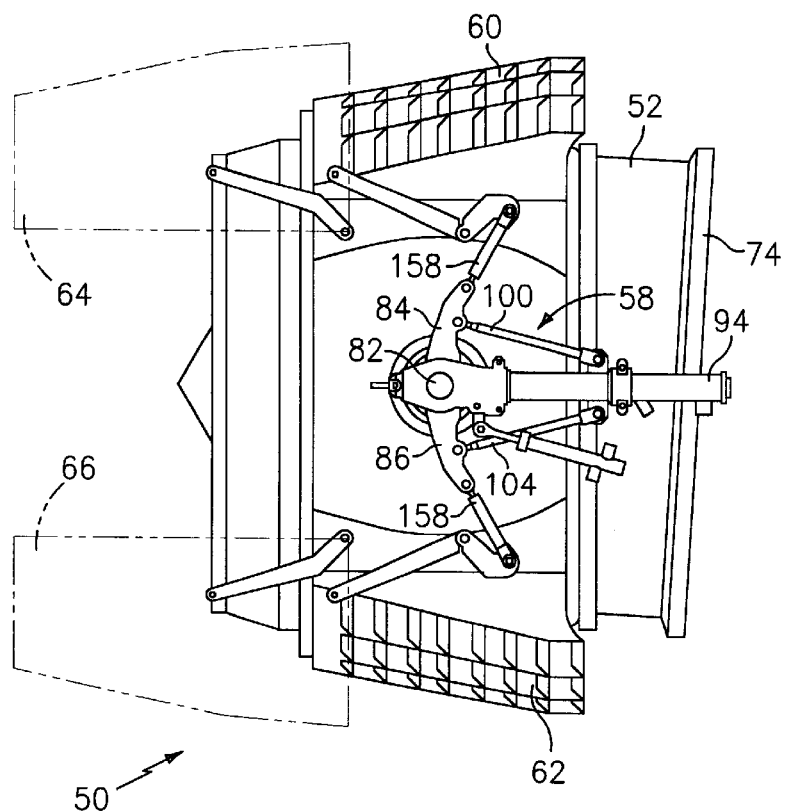

FIGS. 9, 13A, and 13B also generally show the inboard and outboard actuation mechanisms 56, 58 after they have been affixed to the frame 52. The actuation mechanisms 56, 58 each generally lie over the inboard and outboard actuation mechanism frame through-holes 124, 126, respectively, with the main hydraulic actuator support guides 94 pointing towards the front of the engine. While most of the components of each actuation mechanism 56, 58 lie external to the frame axial bore 54, the hinge shaft assemblies 82 pass through the frame through-holes 124, 126 (as applicable), with the attachment flanges 88, 90 being connected thereto on the inside of the frame 52. Since the inboard actuation mechanism 56 lies on the inboard side of the frame, and the outboard actuation mechanism 58 lies on the other, outboard side, the respective hinge shaft assemblies 82 (extending through the frame 52) lie opposite one another in the bore 54. Further details regarding this are given below with respect to FIGS. 18 and 19.

Figure 10:
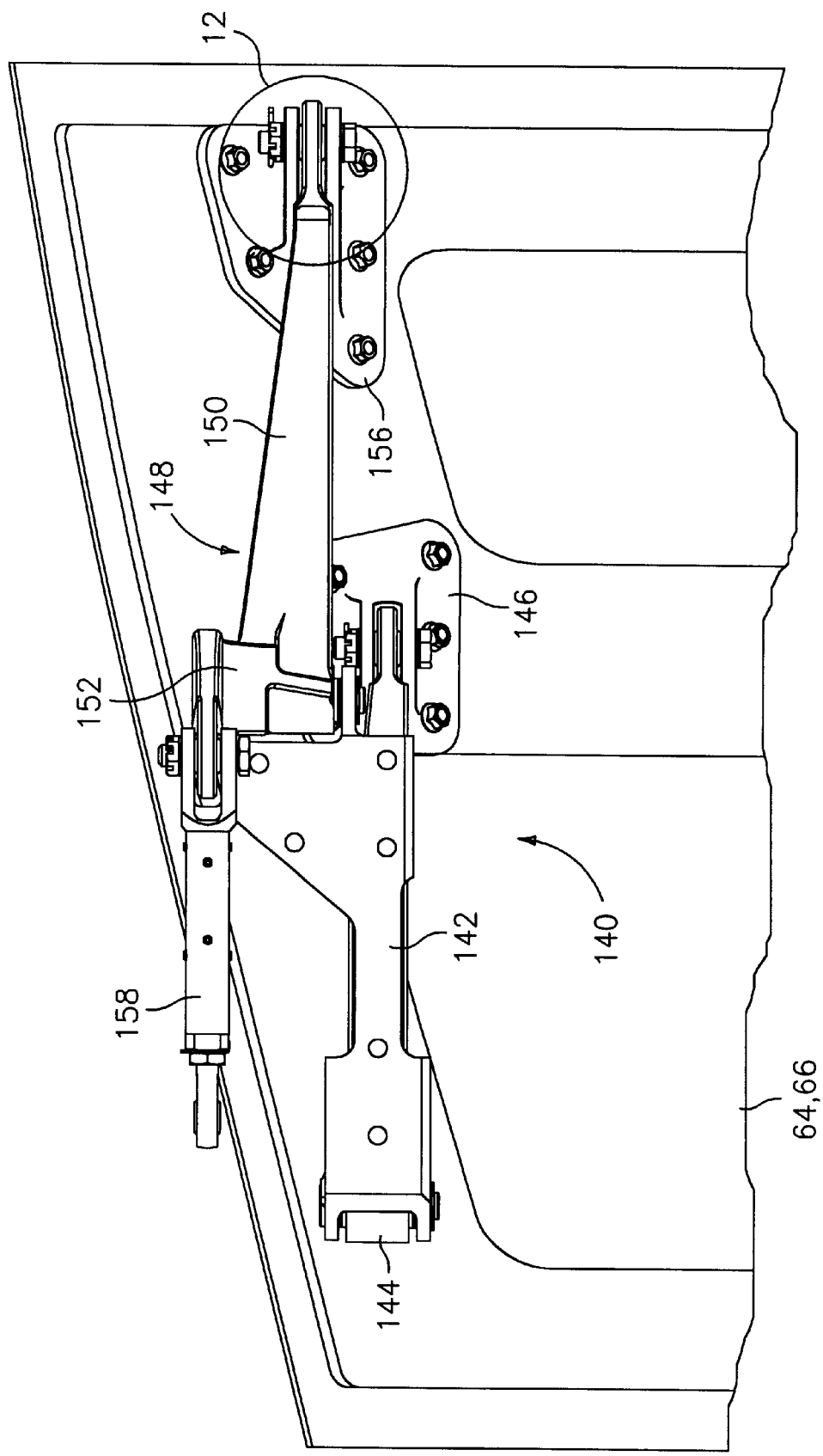
FIG. 10 is a top down view of an underside of a cascade door with swing arm assemblies attached thereto.
Figure 11:
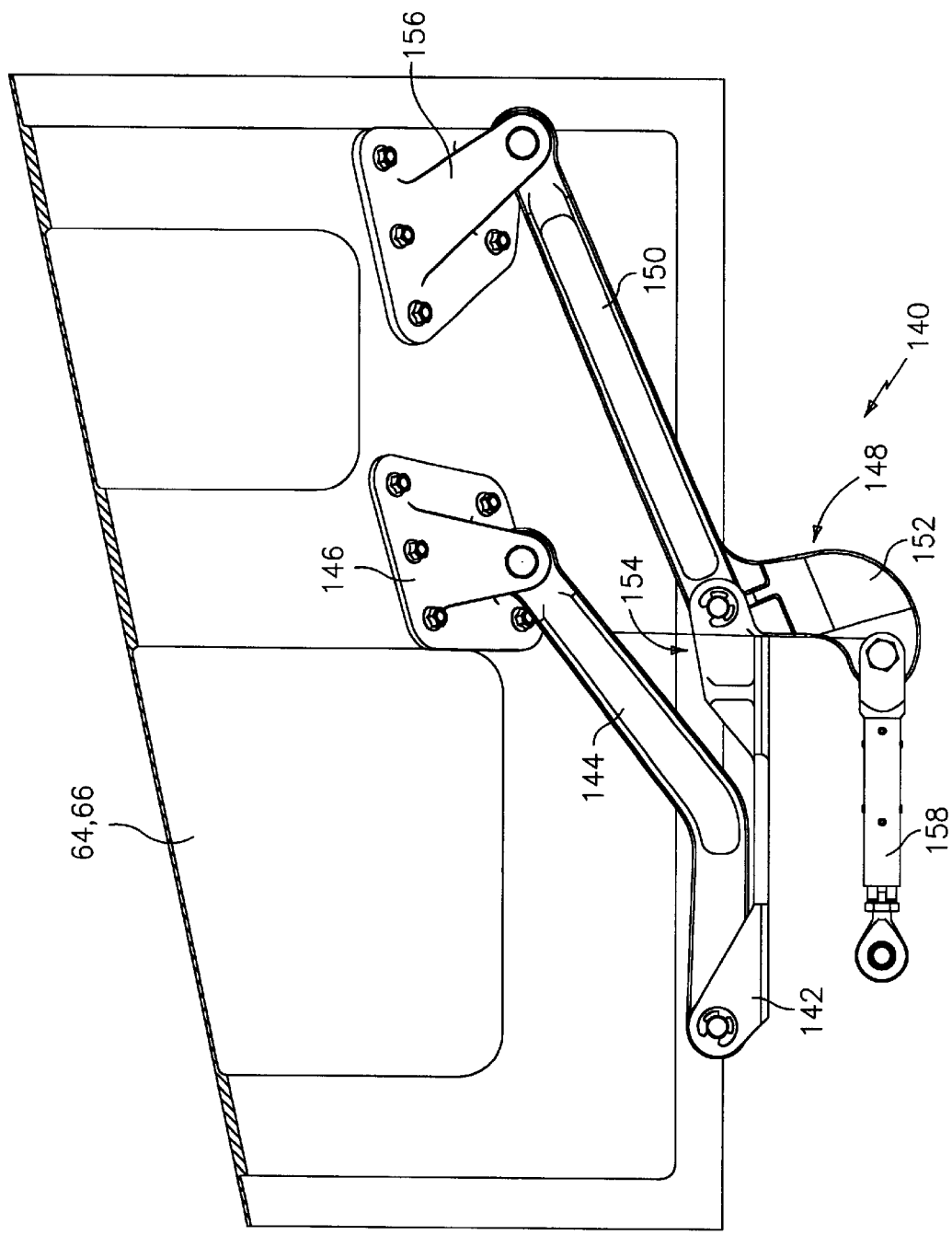
FIG. 11 is a perspective view of one of the swing arm assemblies attached to a side of the cascade door.
Figure 12:
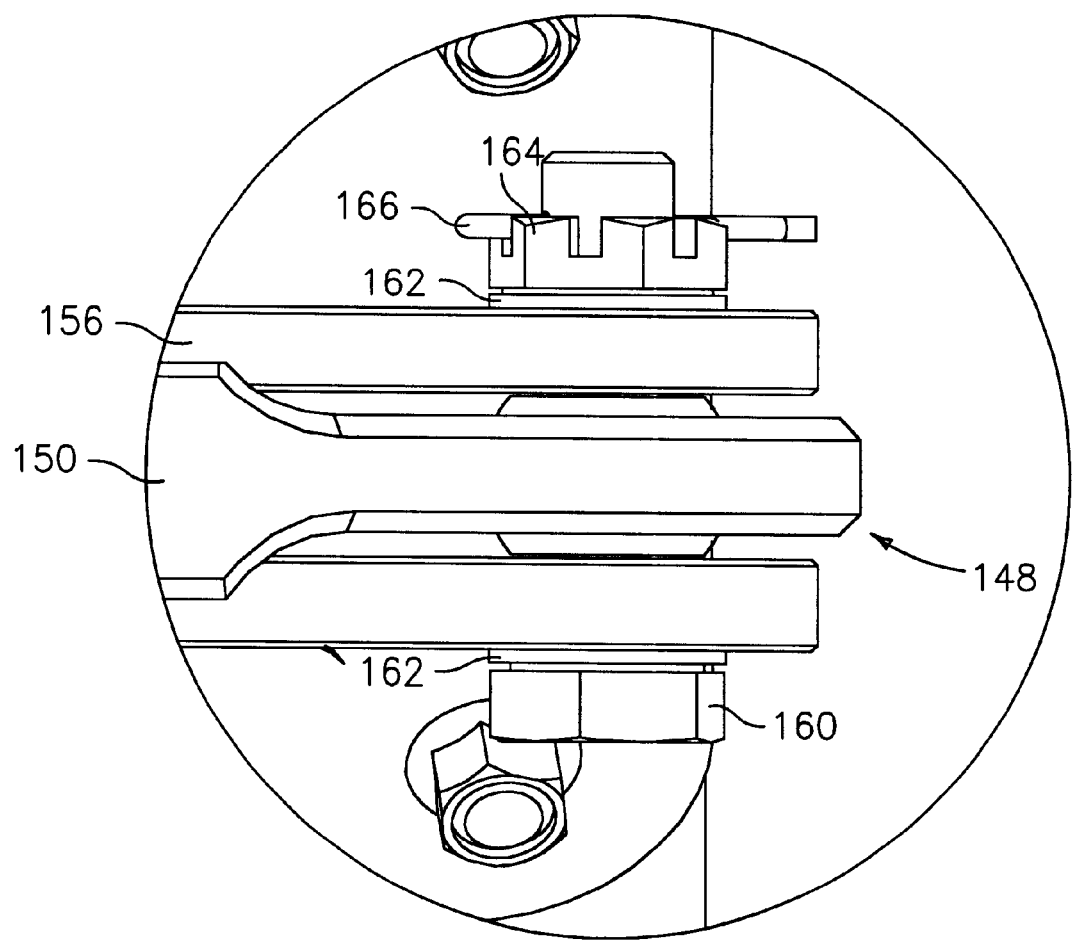
FIG. 12 is a detail view of a swing arm assembly pivot connection.
Figure 15A:
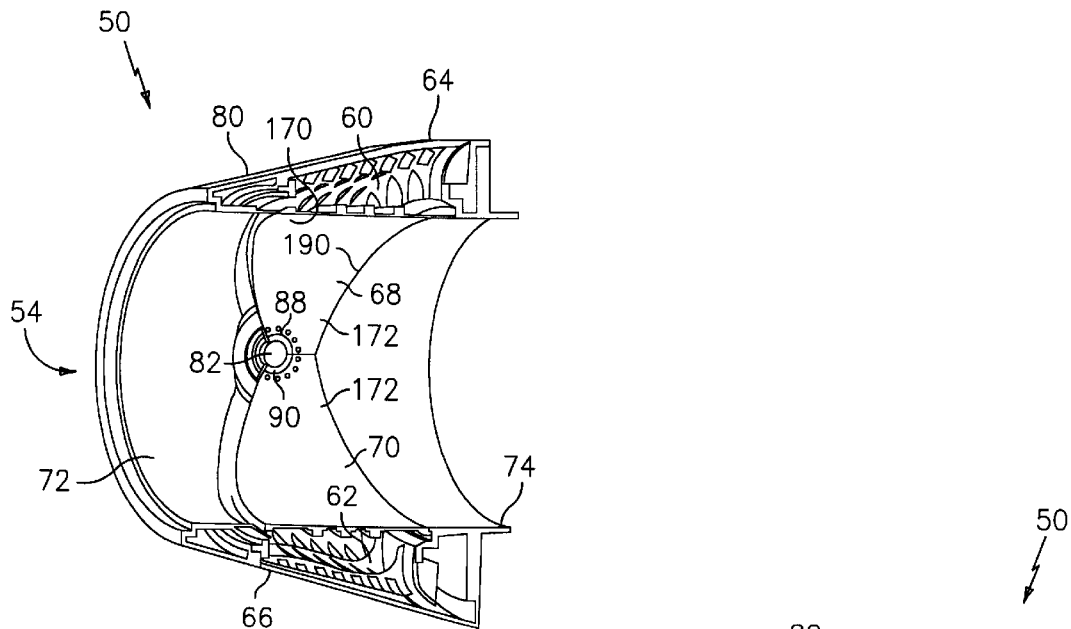
FIGS. 15A and 15B are perspective, longitudinal cross-section views of the thrust reverser in the stowed and the deployed positions, respectively.
Figure 15B:
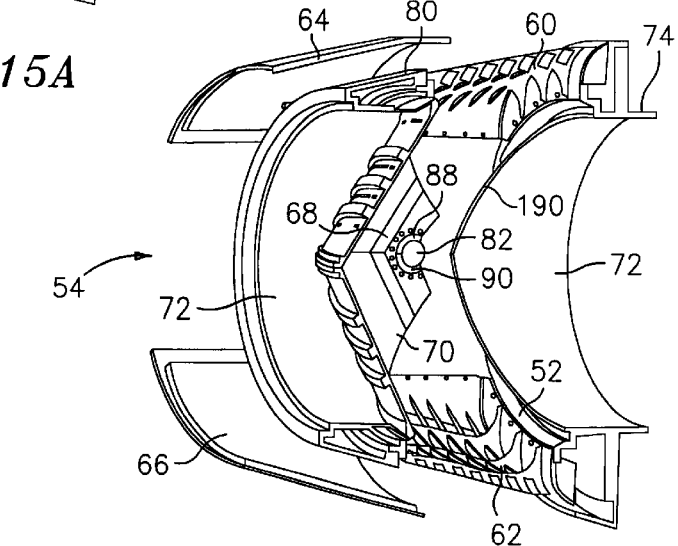

FIGS. 10–12 show a preferred four-bar swing arm assembly mechanism 140 for swingably attaching the cascade doors 64, 66 to the frame 52 and the actuation mechanisms 56, 58. As both cascade doors are the same, only one is shown. Each cascade door 64, 66 is a bowed, shallow U-shaped shell, roughly trapezoidal in outline, dimensioned to fit over the external side of the cascades 60, 62. They are also dimensioned to fit between the various portions of the outer nacelle casing 80 surrounding the cascades 60, 62, so as to provide a continuity of outer surface therewith (as best shown in FIGS. 15A and 15B). This ensures that the engine nacelle is aerodynamically clean, with no flow obstructions in front of the mixer/ejector. This is absolutely necessary for the proper operation of the mixer/ejector noise suppressor system.

Turning now to FIG. 10 (and as also shown in FIGS. 4A–4C), either side of each cascade door 64, 66 is provided with a swing arm assembly 140. A swing arm bracket 142 portion of the swing arm assembly 140 is used to attach the swing arm assembly to the frame 52. The swing arm bracket 142 is a flat plate shaped to fit atop the frame's swing assembly attachment flanges 128, 130, 132, 134, and has matching bolt holes for facilitating connection therewith. Further, the swing arm bracket 142 has upwardly and outwardly extending devises at either end. An aft swing arm 144 is pivotally attached at a first end to one of the clevises, and is pivotally attached at the other end to the door 64, 66 via a first clevis-like door bracket 146.

As best seen in FIG. 11, the fore swing arm 148 includes a long straight section 150 and a rounded leverage extension 152 forming a shoulder 154 therewith. The fore swing arm 148 is pivotally connected to the other clevis of the bracket 142 at the shoulder 154, and to a second door bracket 156 at a free end of the straight section 150. Also, a short push/pull rod 158 is pivotally attached to the end of the leverage extension 152.

Pivot connections can be effectuated in the present invention in any m manner as desired. FIG. 12 shows an exemplary pivot assembly for pivotally connecting the fore swing arm 148 and the second door bracket 156. The pivot assembly comprises a bolt 160, washers 162 on either side of the clevis of the bracket 156, a castellated nut 164 to hold the bolt 160 in place, and a cotter pin 166 to hold the nut 164 in place. Alternatively, other pivot connections could be used, such as, e.g., a pivot connection secured by a c- or e-clip, as shown in FIG. 11.

Figure 14:
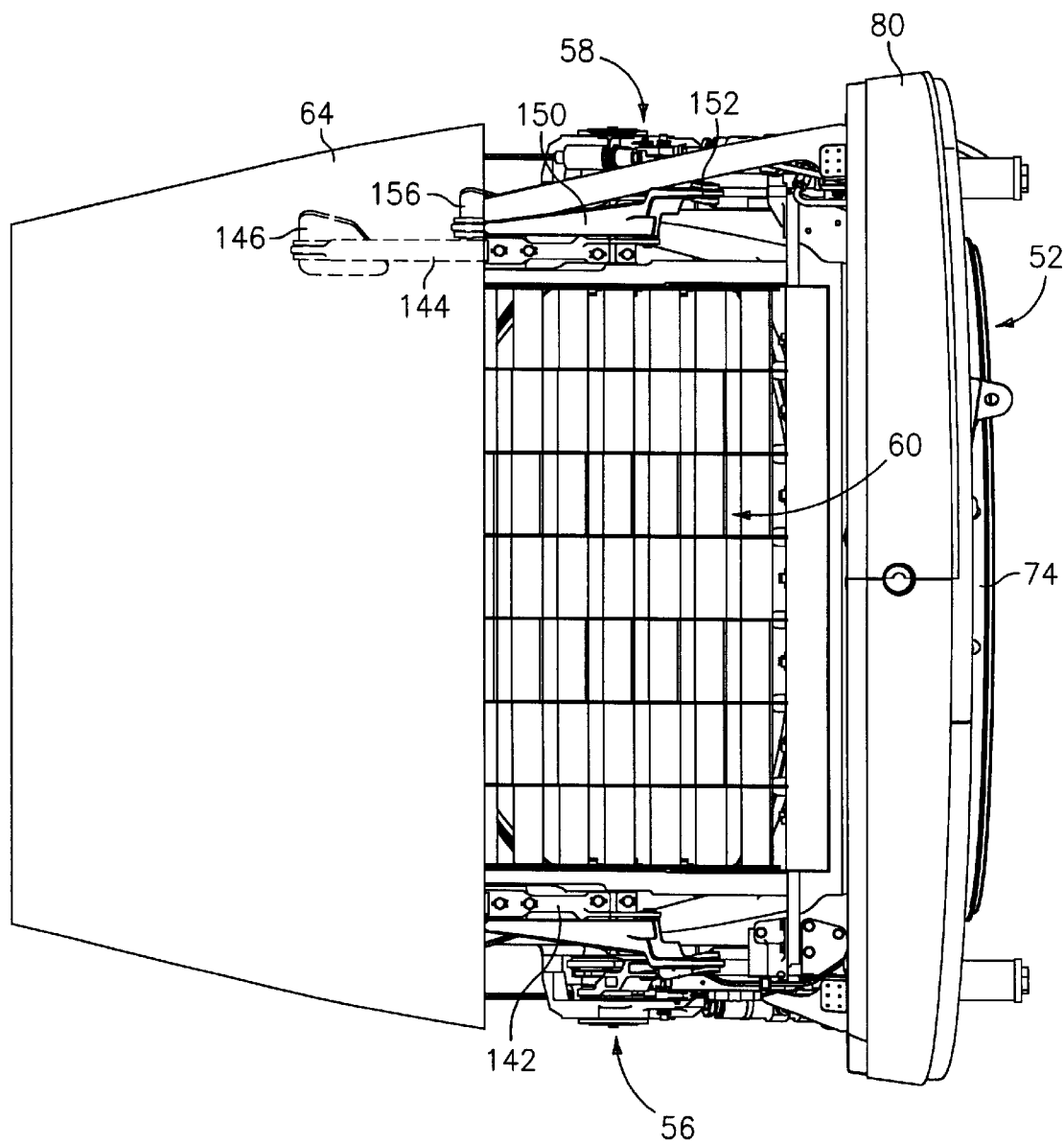
FIG. 14 is a top down view of the complete thrust reverser in the deployed position.

Turning now to FIGS. 13A, 13B, and 14, the operation of the actuation mechanisms 56, 58 and cascade doors 64, 66 will now be described in further detail (note that FIGS. 4A–4C also show the movement of the mechanism). As shown, the reverser 50 is now essentially completely assembled, save for an actuation mechanism nacelle cover, which has been removed in these views to show the actuation mechanism underneath. Additionally, the cascade doors 64,66 are now swingably attached to the frame 52 (via the swing arm brackets 142 on either side of each door 64, 66 connected to the frame flanges 128,130 and 132, 134, respectively, on opposite sides of the tailpipe frame), and the short push/pull rods 158 are pivotally connected to the clevis-like ends of the inner and outer levers 84, 86 of the actuation mechanisms.

As best shown in FIGS. 4A–4C, 13A, and 13B, each cascade door 64, 66 wraps around the top and bottom of the frame 52, respectively, and is swingably connected (at either side of the door, as shown in FIGS. 4A–4C) to both the outboard and inboard sides of the frame 52 (for clarity, the brackets 142 and frame flanges 128, 130, 132, 134 are not shown). Also, one of the swing arm assemblies 140 of each cascade door is pivotally connected to the inner lever 84 of one actuation mechanism (either the inboard 56 or outboard 58), and the other swing arm assembly of each cascade door is pivotally connected to the outer lever 86 of the other actuation mechanism. For example, in FIG. 13A, the shown swing arm assembly 140 of the upper cascade door 64 is pivotally connected to the inner lever 84 of the outboard actuation mechanism 58. On the inboard side, the other swing arm assembly 140 (not shown) of the upper cascade door 64 is pivotally connected to the outer lever 86 of the inboard actuation mechanism 56 (not shown). This is because the inboard and outboard actuation mechanisms, rather than being mirror-images of each other, are generally the same, with like features being longitudinally "flipped" across the frame 52.

FIG. 13A shows a simplified view of the outboard side of the thrust reverser 50 in its stowed position. It is important to note that the inboard side functions concurrently with and in the same manner as the outboard side (e.g., both the inboard and outboard actuation mechanisms work concurrently via a common application of hydraulic pressure to the main cylinders 92). In the reverser's stowed position, the traverse beam 96 lies closest to the hinge shaft assembly 82 of the actuation mechanism 58. The long push/pull rods 100, 104 extend past the hinge shaft assembly 82, and the inner and outer levers 84, 86 are in a forward position extending past most of the actuation mechanism. Also, the cascade doors 64, 66 lie in place over the respective cascades 60, 62, with the swing arm assemblies 140 lying in a retracted position as shown in FIG. 11, where the aft swing arm 144 lies over bracket 142 and the long straight portion 150 of the aft swing arm 148 extends forward and past the bracket 142.

To reach the reverser's fully deployed position as shown in FIGS. 13B and 14, the hydraulic cylinder 92 (see FIG. 19) moves the traverse beam 96 along the main hydraulic actuator support guide 94 away from the hinge shaft assembly 82. Concurrently, the long push/pull rods 100, 104 move back with the traverse beam 96, and cause the inner and outer levers 84, 86 to rotate (approximately 50–60°) clockwise and counterclockwise, respectively, about the hinge shaft assembly 82. Additionally, the rotating levers 84, 86 push the short push/pull rods 158, which in turn push against the leverage extensions 152 of the fore swing arms 148. This causes the fore swing arms 148 to pivot about the point where the shoulders 154 are pivotally connected to the brackets 142, causing the long straight sections 150 of the fore swing arms 148 to pivot out and aft. Thus, the cascade doors 64, 66, pivotally connected to the fore swing arms 148, are swung out and aft, uncovering the cascades 60, 62. The aft swing arms 144 likewise track the movement of the fore swing arms 148.

FIGS. 15A and 15B illustrate another key feature of the present invention. Here, the thrust reverser 50 can be seen in longitudinal cross-section, detailing the operation of the upper and lower blocker doors 68, 70. As mentioned above, the blocker doors 68, 70 are attached to the levers 84, 86 (through the hinge shaft assembly 82), so that when the levers 84, 86 are moved via the traverse beam 96 (to stow or deploy the cascade doors), the blocker doors 68, 70 are likewise stowed or deployed.

Each blocker door 68, 70 is a generally shallow, U-shaped shell shaped and dimensioned to match the cylindrical shape of the interior frame wall 72. The blocker doors 68, 70 each have a wide center "valley" portion 170 that narrows and curves up at either end 172, 174 (see FIGS. 4A–4C). The inner surface of each blocker door is aerodynamically clean, while the outer surfaces have reinforcing ridges or the like. Additionally, the edges of the blocker doors have flow seals to minimize flow leakage in both the stowed and deployed positions. Furthermore, each blocker door 68, 70 is supported between the inboard and outboard actuation mechanisms 56, 58 by being pivotally coupled to the hinge shaft assemblies 82 at the ends 172, 174. For example, in FIG.

15A, the end 172 of the upper blocker door 68 is attached to the first blocker door attachment flange 88 of the outboard actuation mechanism 58. In this view, the other end 174 of the upper blocker door 68 would be attached to the second blocker door attachment flange 90 of the inboard actuation mechanism 56 (again, because the actuation mechanisms are longitudinally flipped with respect to one another across the frame 52).

Figure 16:
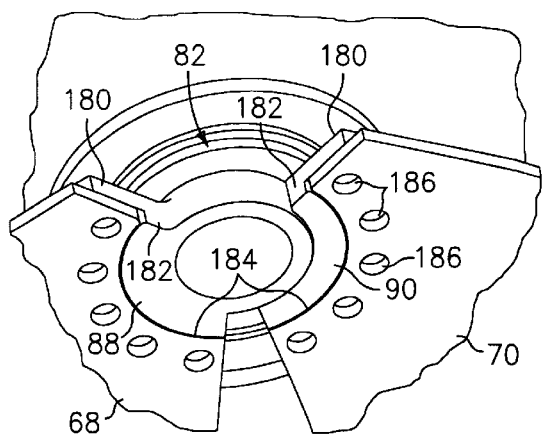
FIG. 16 is a perspective view showing upper and lower blocker doors positioned over first and second attachment flanges for being connected thereto.
Figure 17:
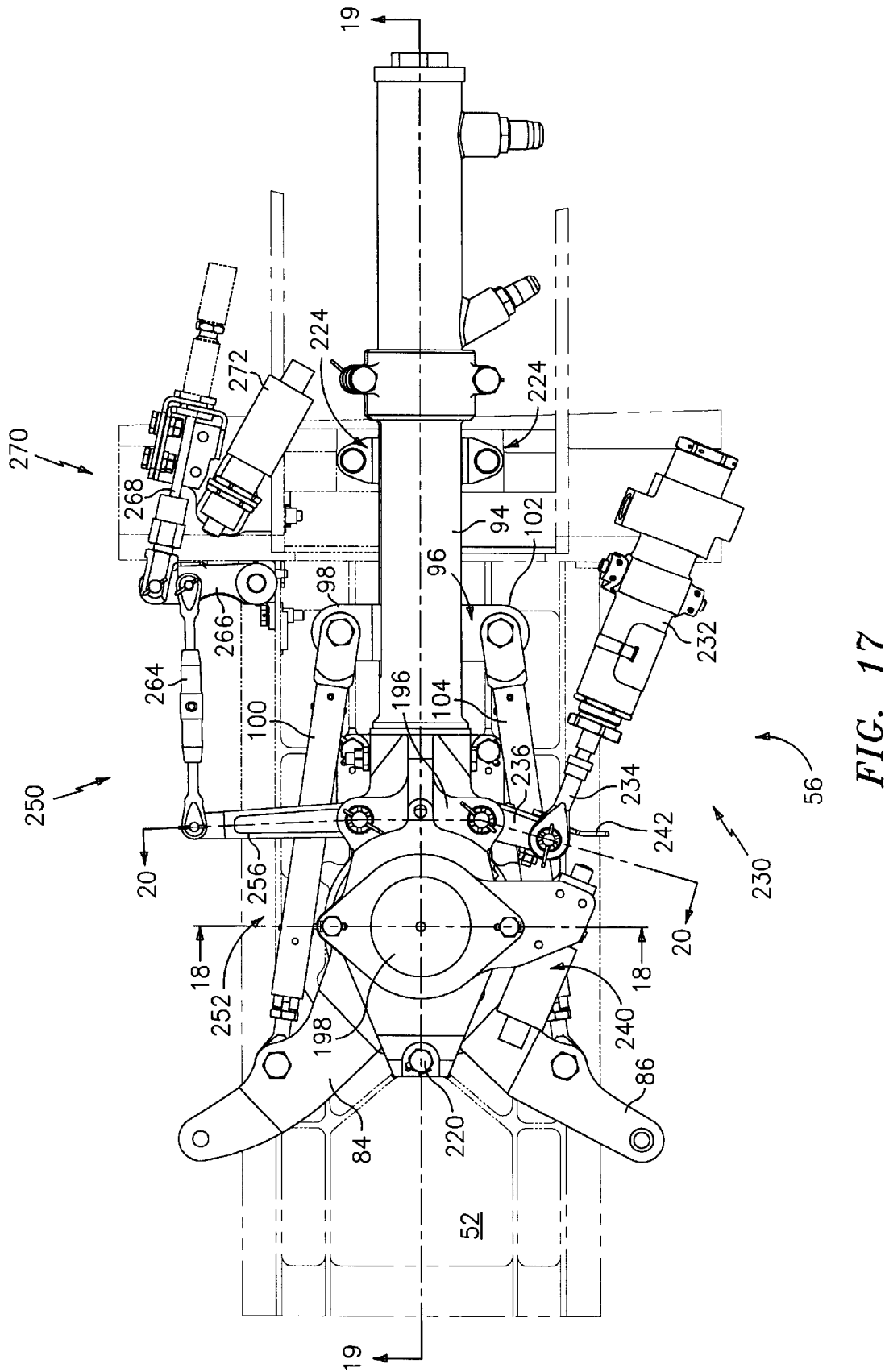
FIG. 17 is a side view of an inboard thrust reverser actuation mechanism.

A more detailed view of how the blocker doors 68, 70 are attached to the attachment flanges 88, 90 is shown in FIG. 16. Each attachment flange 88, 90 has an arc-shaped base 180 bordered by an arc-shaped shoulder 182 along its inner radius. The ends 172, 174 of the blocker doors 68, 70 each have a rounded notch 184 dimensioned to fit against the shoulder 182, as well as a plurality of attachment bores 186, which align with a similar set of bores 188 in the attachment flanges 88, 90 (see FIG. 18). Note that the connectors used to finally secure the blocker doors to the attachment flanges are not shown in this view, and that many suitable connectors (eg., bolts, washers, and secured nuts, as in FIG. 12) could be used.

Turning back to FIGS. 15A and 15B, the operation of the blocker doors 68, 70 will now be discussed. In the reverser's stowed position, the blocker doors 68, 70 substantially align with the internal wall 72 of the frame 52, in effect forming a portion thereof and thereby covering the cascades 60, 62 from the inside. This arrangement is facilitated by leading edges of the blocker doors fitting up against an aft-facing shoulder 190 portion of a fore section of internal wall 72, as best seen in FIGS. 8 and 15B. Thus, when the reverser is in the stowed position, engine thrust passes down through the tailpipe and between the blocker doors, and is not agitated or disturbed thereby (note that the thrust reverser, when stowed, must have a minimal aerodynamic effect on the engine thrust for the mixer/ejector noise suppressor to work optimally).

To move the blocker doors 68, 70 into their deployed positions, as shown in FIG. 15B, the traverse beams 96 of the inboard and outboard actuation mechanisms 58, 60 are moved concurrently away from the hinge shaft assemblies 82 (via the hydraulic cylinders 92), thereby rotating the inner and outer levers 84, 86 of each. Since the attachment flanges 88, 90 are connected to the levers 84, 86 through the hinge shaft assemblies 82 (as described below), they rotate with the levers, causing the blocker doors to pivot aft. At the moment the traverse beams 96 and levers 84, 86 reach their fully deployed positions (as in FIG. 13B), trailing side edges of the blocker doors 68, 70 meet to leave the blocker doors in an angled position obstructing the tailpipe bore 54. Also, since the blocker doors 68, 70 have pivoted aft, the cascades 60, 62 are uncovered from the inside. Engine thrust, instead of passing through the tailpipe/reverser, now strikes the blocker doors, and is redirected towards the cascades 60, 62. The engine thrust passes through the fore-angled slats, and is further redirected forwards. The exhaust flow is therefore deflected forward in two steps, providing more effective reverse thrust than existing bucket-type, post-exit reversers.

Another feature of the blocker door apparatus is that the location of the center of pressure on the blocker doors 68, 70 in the stowed position is designed to provide an opening moment on the support hinge. Thus, even with a complete failure of all mechanisms and linkages, aerodynamic forces would keep the blocker doors in the stowed position.

The actuation mechanisms 56, 58 are shown in further detail in FIGS. 17–25 with reference back to FIGS. 6 and 7. As mentioned above, the inboard and outboard mechanisms are almost entirely the same. Each has: the hinge shaft assembly 82; the inner and outer levers 84, 86; the attachment flanges 88, 90; the hydraulic cylinder 92; the main hydraulic actuator support guide 94; the traverse beam 96; and the long push/pull rods 100, 104.

Figure 18:
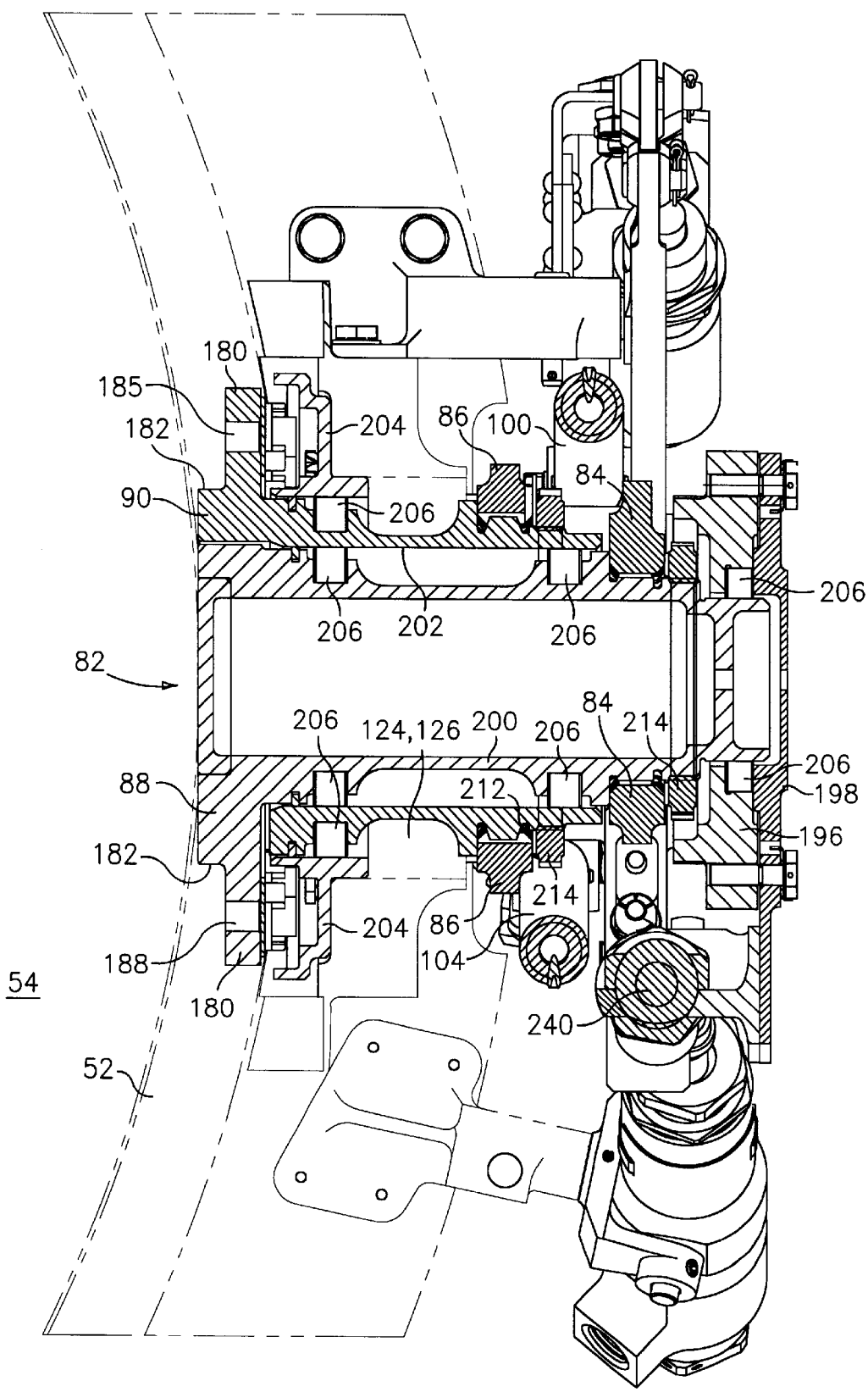
FIGS. 18–20 are cross-sectional views of the inboard actuation mechanism shown in FIG. 17.
Figure 19:
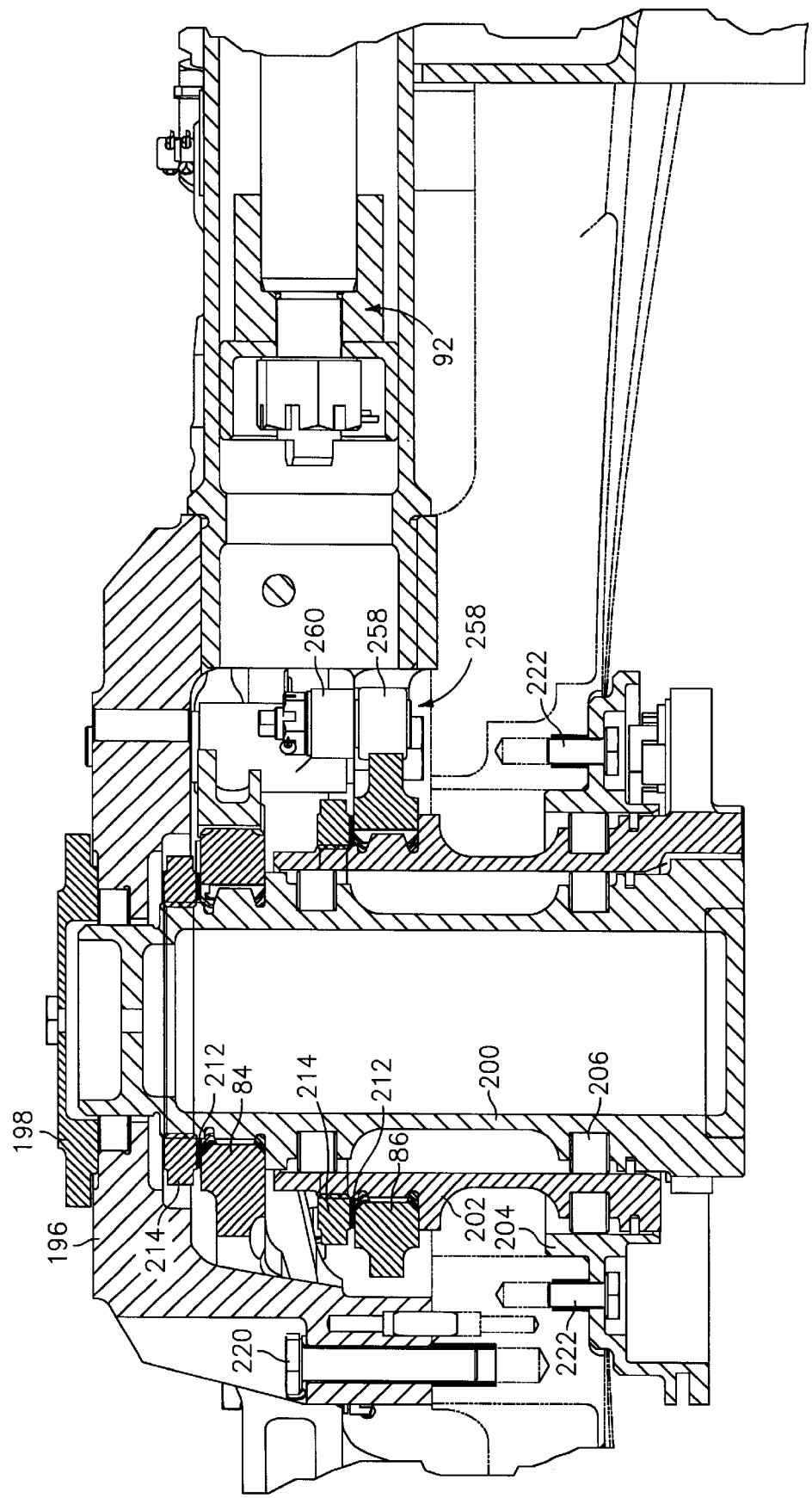
Figure 20:
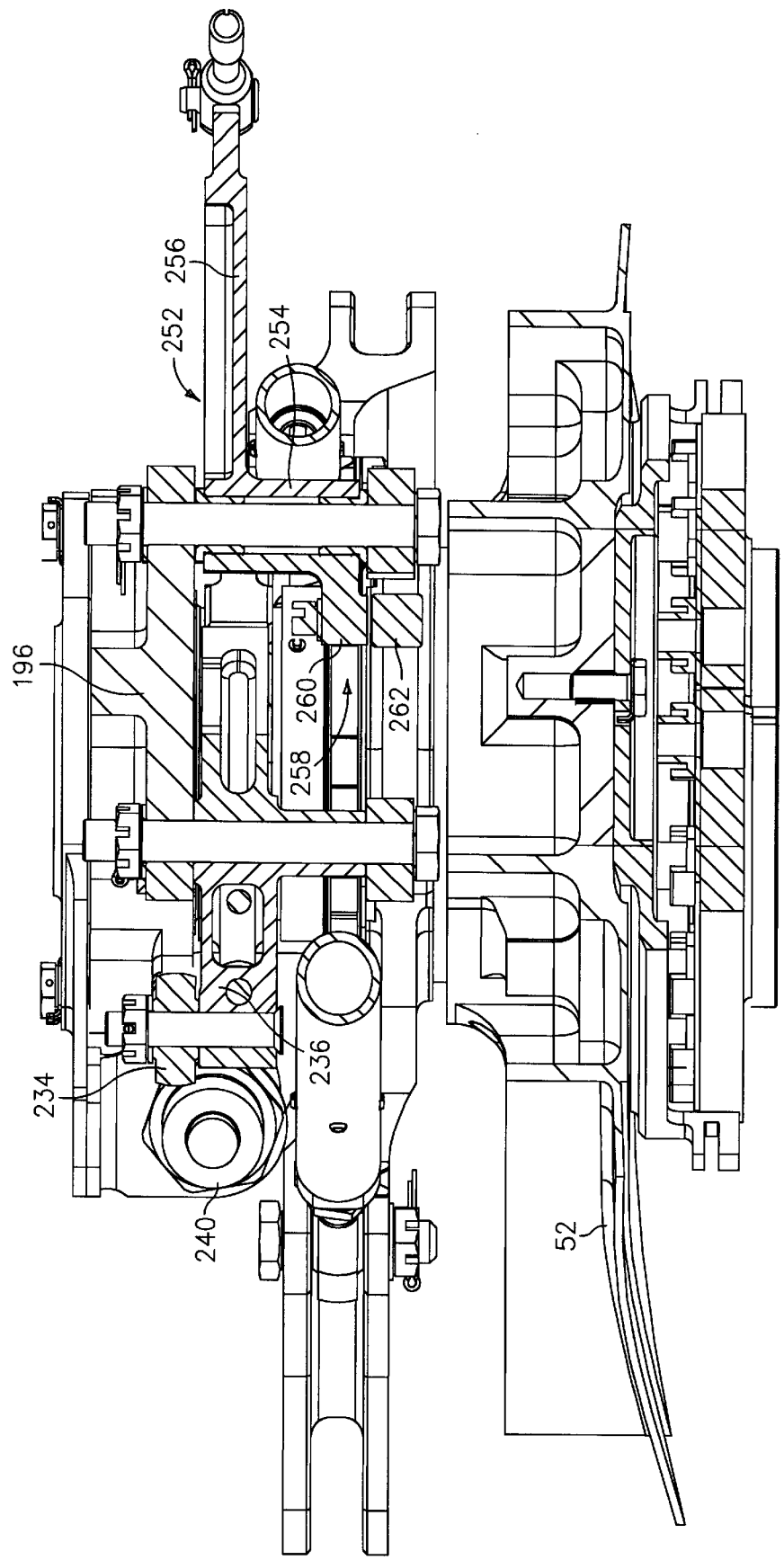

The internal structure of the actuation mechanisms is best shown in FIGS. 18–20, and includes the hinge shaft assembly 82 covered at one end by a support bridge 196 and an end-plate 198. The support bridge 196 fits over the hinge shaft assembly 82 and provides structural support for various components including the actuator support guide 94 and various pivots (see below). Also, the end-plate 198 covers the end of the hinge shaft assembly 82 and likewise provides support for various additional components.

The hinge shaft assembly 82 actually comprises an inner hinge shaft 200 and an outer hinge shaft 202. Both shafts 200, 202 are free to independently rotate within an arc of about 110–130°, as defined by the arc the attachment flanges 88, 90 can travel before hitting (see FIGS. 15A, 15B and 16). This is because the attachment flanges 88, 90 are extensions of the inner and outer shafts 200, 202, as shown. The shafts 200, 202 are rotatably supported and held in place via supporting structure, such as a roller race 204 and a plurality of rollers 206. The rollers 206 are each a small, cylindrical metal piece performing a ball-bearing like function, and are kept in place via track-like grooves provided in the various components.

Figure 21:
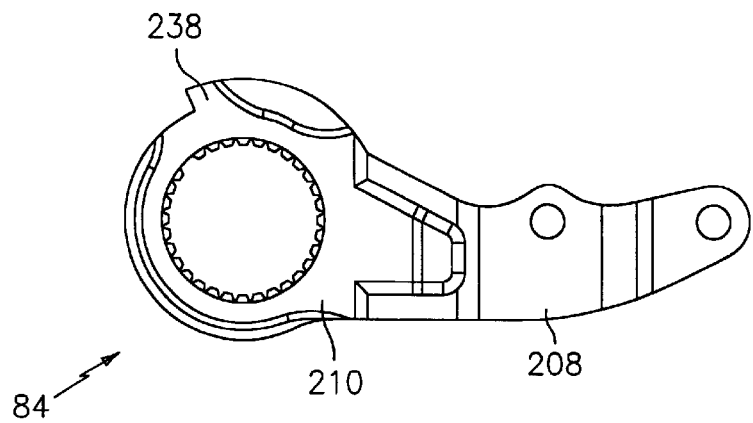
FIG. 21 is a profile view of an actuation mechanism inner lever.
Figure 22:
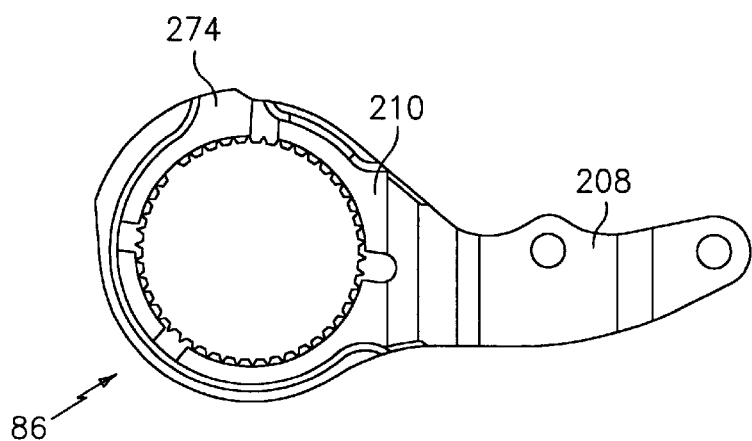
FIG. 22 is a profile view of an actuation mechanism outer lever.
Figure 23:
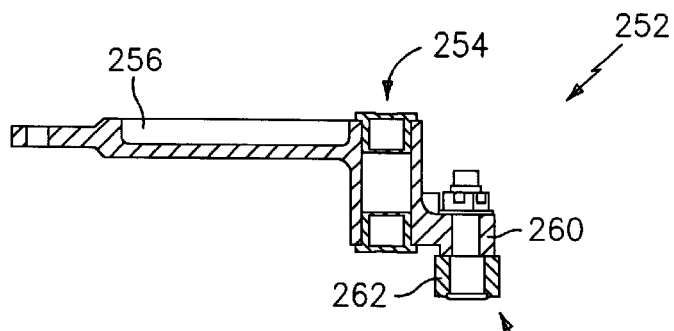
FIG. 23 is a cross-sectional view of an actuation mechanism detent arm assembly.

The levers 84, 86 are operably connected to their respective shafts 200, 202 via complementary spline features. As shown in FIGS. 21 and 22, each lever 84, 86 comprises an arm portion 208 extending out from a toothed ring portion 210. For attachment, each lever 84, 86 simply slips over its respective shaft 200, 202, with the toothed ring portions 210 engaging complementary shaped tooth features on the shafts. The levers 84, 86 are prevented from moving axially via washers 212 and shaft nuts 214, which engage thread features provided on the shafts at appropriate locations.

Because the environment in which the actuation mechanisms are meant to function is relatively rugged, various standard seals and caps are provided to prevent induction of hot gases and other contaminants into the hinge shaft assembly 82. For example, the inner hinge shaft 200 is capped flush with the inside tailpipe surface to prevent hot gases from entering the shaft's core. This minimizes the environmental temperatures imposed on the rollers 206. Also, the hinge shafts 200, 202 are fitted with improved dynamic interface seals.

The actuation mechanisms are affixed to the frame 52 via conventional means. For example, the aft end of each actuation mechanism is affixed to the frame via a bolt 220, while the roller race 204 is affixed to the inside of the frame 52 via a plurality of bolts 222. Additionally, the main hydraulic actuator support guide 94 is affixed to the frame 52 via flange and bolt assemblies 224.

Figure 24:
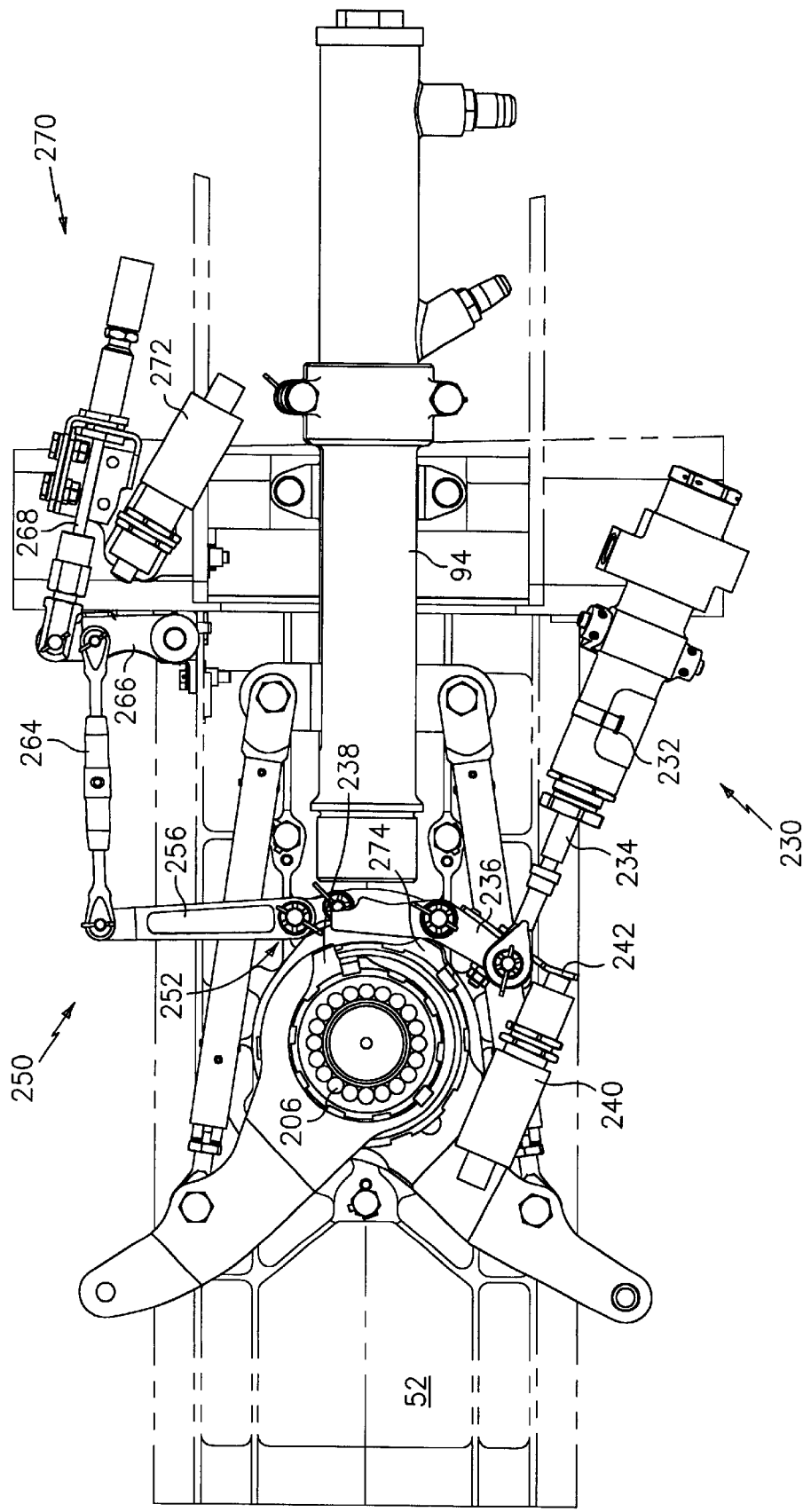
FIG. 24 is a side view of the inboard actuation mechanism in the stowed position, with a lock mechanism disengaged, and with certain parts removed to show inner detail.
Figure 25:
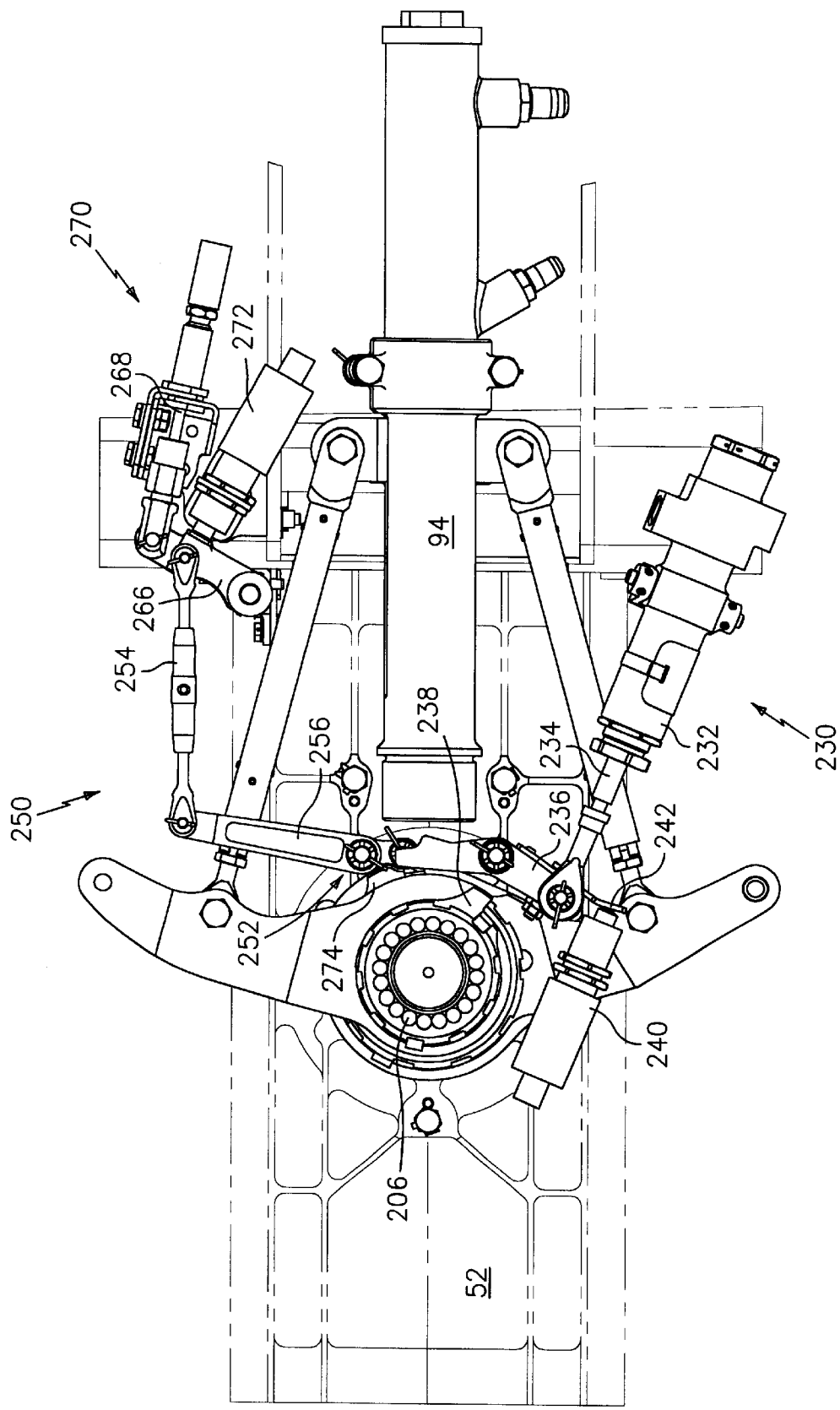
FIG. 25 is a side view of the inboard actuation mechanism in the deployed position, again, with the lock mechanism disengaged and with certain parts removed to show inner detail.

An additional feature found on both the inboard and outboard actuation mechanisms 56, 58 is a lock mechanism 230. The lock mechanism 230 is provided for ensuring that the thrust reverser 50 can only be deployed when the plane's hydraulic pressure is increased just prior to landing. The lock mechanism 230 is powered by a lock hydraulic cylinder 231 (not shown) carried in a lock housing 232. The lock housing 232 is affixed to the frame 52. The lock hydraulic cylinder 231 moves a piston 234, the end of which is pivotally connected to a first end of a lock pawl 236. The lock pawl, as best shown in FIGS. 6, 24, and 25, is a short, slightly bent piece that is also pivotally connected proximate its middle to the support bridge 196. A second end of the lock pawl 236 is configured to abut a ratchet shoulder 238 portion of the inner lever 84.

To prevent the thrust reversers 50 from deploying at times other than when the plane has landed, the lock mechanisms 230 on each actuation mechanism 56, 58 are normally engaged, with the pistons 234 being retracted and the lock pawls 236 abutting the ratchet shoulders 238, as shown in FIG. 6. In this position, the inner levers 84 are incapable of rotating, and thus the remainder of the mechanisms are likewise inhibited (that is, neither the cascade doors nor the blocker doors can move to their deployed positions). The lock mechanisms 230 are configured to only be actuable when the plane's hydraulic system pressure is at an elevated level, typically above 2400 psi, for landing.

By way of explanation, in most planes (e.g., the Gulfstream® II/IIB/III) the hydraulic system pressure will be less than about 2400 psi most of the time (typically around 2000 psi), but will ramp up just subsequent landing to above about 2400 psi. When the pressure is above this level, the lock mechanisms 230 can be actuated, with the pistons 234 extending out to pivot the lock pawls 236 out of engagement with the ratchet shoulders 238 (see FIGS. 24 and 25), thereby enabling the thrust reversers 50 to be deployed. Preferably, the lock cylinders 231 are configured to automatically move the pistons 234 out (and to further pass along hydraulic pressure) only when the increased pressure is applied to the lock cylinders 231. Further detail regarding the thrust reverser's integration with the plane's hydraulic system is given below.

To alert the airplane's pilots that the actuation mechanisms are unlocked, each locking mechanism 230 is provided with a switch 240 held by a flange extension portion of the end-plate 198, and a switch actuation plate 242 attached to the lock pawl 236. When the lock pawl 236 is pivoted into disengagement from the ratchet shoulder 238, the switch actuation plate 242 moves towards and hits the switch 240, which actuates in response. This causes a indication light or other warning device in the plane's cockpit to activate, alerting the pilots that the thrust reversers are unlocked.

The primary difference between the inboard and outboard actuation mechanisms 56, 58 is that the former includes a throttle feedback assembly 250, which is shown in FIGS. 17, 23, 25 and 26. This assembly helps ensure that the throttle level of the engines is reduced if the thrust reversers 50 move to the stowed position when the engines are throttled up just subsequent landing.

Typically, when an airplane lands, its thrust reversers are deployed to redirect thrust and thereby help slow the airplane during rollout. At the same time, to further this effect, the engines are usually throttled up by the pilots to increase the amount of redirected thrust and thereby further decelerate the plane. However, if the thrust reversers are stowed during this throttle-up period (either through a mechanical problem or pilot error), the increased engine thrust, no longer redirected by the thrust reverser doors, serves to detrimentally accelerate the plane. Therefore, it is beneficial to have a feedback mechanism that automatically throttles down the engines (if necessary) when the thrust reversers are stowed.

In the present invention, the throttle feedback assembly 250 performs this function. To do so, a detent arm assembly 252 is pivotally attached about a main shaft portion 254 to the support bridge 196. An arm 256 is connected to an upper end of the main shaft 254, and extends out from the actuation mechanism to lie roughly perpendicular thereto. A roller assembly 258 is attached to a lower end of the main shaft, and includes an upper support 260 and a cylindrical roller 262. The roller 262 lies under and proximate the upper support 260, and is rotatably held in place by a bolt or the like extending up through the upper support and held in place by a castellated nut and cotter pin. A distal end of the arm 256 is pivotally connected to a turnbuckle 264, which is in turn pivotally connected proximate a middle of a feedback arm 266. One end of the feedback arm 266 is pivotally connected to the frame 52, and the other is pivotally connected to a throttle feedback cable 268 supported by a throttle feedback cable assembly 270. Another switch 272, connected to the frame 52, lies near the feedback arm 266 for being actuated thereby.

When the detent arm assembly 252 is in place, the roller 262 is in position (see FIGS. 20, 24 and 25) to interact with a cam shoulder 274 portion of the outer lever 86 (when assembled, the cam shoulder 274 lies in the same plane as the roller 262). In the stowed position, as shown in FIG. 26, the cam shoulder 274 lies away from the detent arm assembly 252, and the arm 256 is in a first position. Here, the feedback arm 266 is in an aft position, and is not in contact with the switch 272. Likewise, the throttle feedback cable 268 is extended aft.

When the actuation mechanism 56 moves to the deployed position, the outer lever 86 pivots, bringing the cam shoulder 274 into contact with the roller 262. As the cam shoulder 274 passes by the roller 262, the roller rotates and causes the detent arm assembly 252 to pivot about the main shaft 254. This causes the arm 256 to pivot, forcing the feedback arm 266 against the switch 272, and also forcing the throttle feedback cable 268 towards the fore.

Subsequently, when the actuation mechanism 56 moves to the stowed position, the cam shoulder 274 interacts with the roller to cause the detent arm assembly 252 to pivot aft. The switch 272 is de-actuated, and the cable 268 is again pulled aft. This causes the engines to throttle down (if necessary), and further alerts the pilots (via the switch 272 electrically connected to cockpit warning lights or the like) that the thrust reversers have stowed.

Figure 26B:
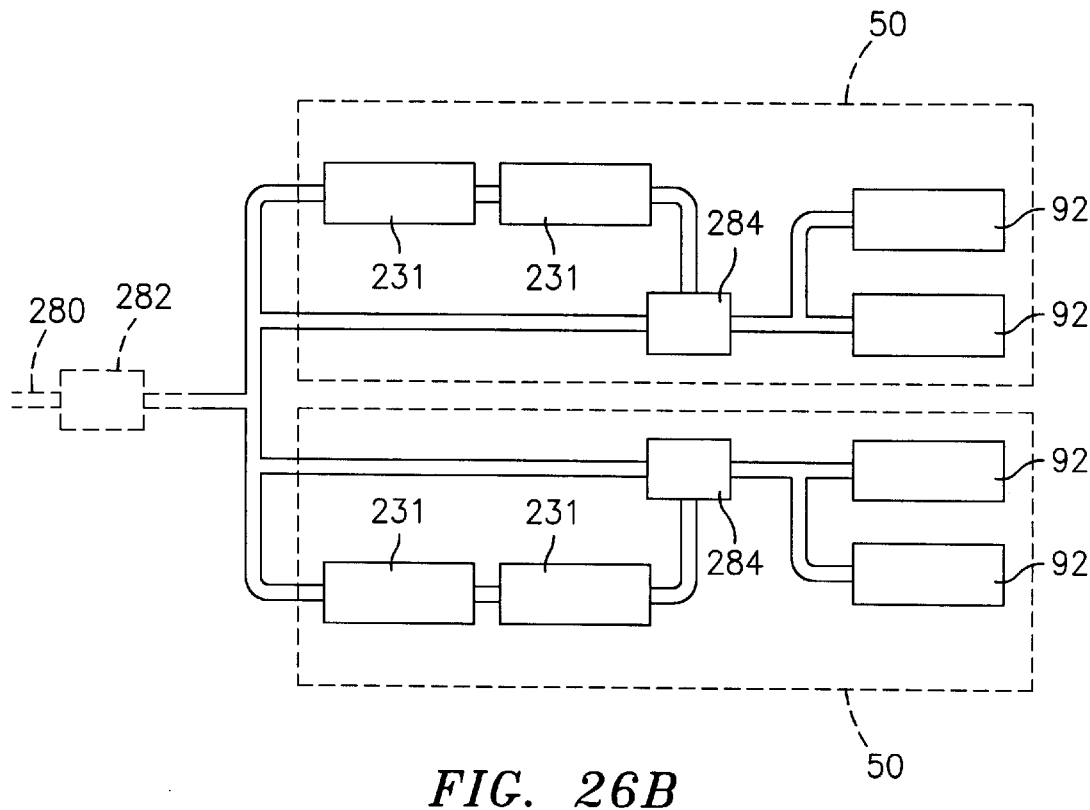
FIGS. 26A and 26B are simplified schematic diagrams showing how two thrust reversers of the present invention are hydraulically interconnected to a plane's existing hydraulic system.
Figure 26A:
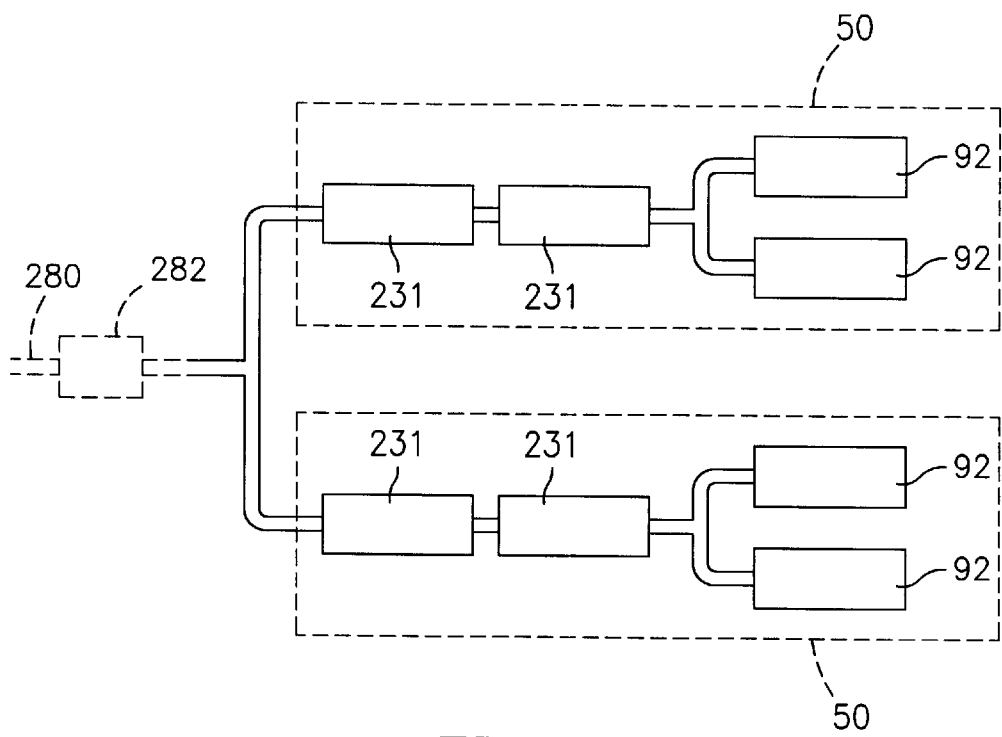

Turning now to FIGS. 26A and 26B, further detail regarding the arrangement and connection of the hydraulic components found in the present invention will now be given. As mentioned above, the thrust reversers 50 of the present invention are meant to directly replace the airplane's existing thrust reversers, and are preferably directly compatible with the plane's hydraulic system so that no upstream modifications to the plane's systems are needed.

A typical small jet will have two thrust reversers, one for each engine. The entirety of the thrust reverser system is supplied by one hydraulic line 280. A controllable valve 282 is disposed along this line, and when a pilot operates the relevant switch in the cockpit, the valve is opened and pressurized hydraulic fluid is supplied to the thrust reversers. If a plane's existing reversers are replaced with the reversers 50 of the present invention, there will be total of four lock hydraulic cylinders 231 and a total of four main hydraulic actuation cylinders 92. These are preferably interconnected according to one of the schemes shown in FIGS. 26A and 26B.

In FIG. 26A, the thrust reversers 50 are connected in hydraulic parallel such that when the valve 282 (note that this is an existing part of the aircraft) is opened, pressure is supplied to both thrust reversers 50. The main cylinders 92 for each reverser are connected in parallel, and are in turn connected in series to the two lock cylinders 231, also connected in series. When the valve 282 is opened, pressure must flow first through each lock cylinder 231 before reaching the main cylinders 92. Note that if the system pressure is less than about 2400 psi, the first in line lock cylinder 231 will not open, thereby preventing the pressure from reaching (and actuating) the main cylinders 92, and also preventing the particular lock mechanism from disengaging.

Alternatively, as shown in FIG. 26B, each set of serially connected lock cylinders 231 may be used to control a needle valve 284 disposed between each set of parallel connected main cylinders 92 and the main hydraulic line. In this configuration, system pressure does not have to flow through the lock cylinders 231 to reach the main cylinders 92. Of course, the system pressure must still be above 2400 psi or the needle valves 284 will not be opened by the lock cylinders 231.

Most of the reverser frame 52 is preferably fabricated using titanium. Thus, the cascade reverser 50 is lighter than the existing post-exit bucket reversers found on older jet engines, it has a center of gravity closer to the engine/tailpipe mounting flange 74, and it generates lower flange forces during actuation. Additional components of the thrust reverser 50 can be made from titanium or other materials, as applicable, depending on the nature of the particular part.

To ensure that the mixer/ejector noise suppressor functions optimally, it is important that the exterior of the thrust reverser (and the rest of the engine nacelle, for that matter) has a minimal or clean aerodynamic profile. To that end, as described above, the cascade doors 64, 66, when stowed, effectively form a portion of the external paneling 80 of the thrust reverser. Additionally, as also mentioned above (albeit briefly), and as indicated in FIG. 5, it should be appreciated that the actuation mechanisms must be covered with appropriately shaped panels that match the remainder of the external paneling. This ensures a clean profile and that the actuation mechanisms are protected from the elements.

Although the cascade thrust reverser of the present invention has been characterized as being for use with an ALMECT™ ejector/mixer noise suppressor, one of ordinary skill in the art will appreciate that the thrust reverser could be used with different noise suppressor systems without departing from the spirit and scope of the invention.

Also, although the cascade thrust reverser of the present invention has been illustrated as being part of an ejector/mixer noise suppressor system, one of ordinary skill in the art will appreciate that the thrust reverser could be used independently of a noise suppressor system without departing from the spirit and scope of the invention.

Also, although the lock mechanism hydraulic cylinders have been illustrated as having an operational threshold pressure of about 2400 psi, one of ordinary skill in the art will appreciate that this level may vary from plane to plane, and that lock mechanism hydraulic cylinders functioning above other pressures can be provided without departing from the spirit and scope of the invention.

Also, although the actuation mechanisms of the present invention have been illustrated as being powered by hydraulic cylinders, one of ordinary skill in the art will appreciate that the actuation mechanisms could be provided with other power means, such as electric motors, without departing from the spirit and scope of the invention. This would be done, in particular, if the relevant airplane had an electrically powered thrust reverser system.

Since certain changes may be made in the above described cascade thrust reverser, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Having thus described the invention, what is claimed is:

1. A cascade thrust reverser for jet engines comprising:
    a. a frame defining an axial bore and holding a pair of opposed cascades extending from the bore through to an exterior of the frame;
    b. exterior covering means attached to the exterior of the frame for being positionable at one of a stowed position covering the cascades from the outside and a deployed position uncovering the cascades;
    c. interior blocking means disposed in the bore for being positionable at one of a stowed position covering the cascades from inside the bore and a deployed position concurrently uncovering the cascades and blocking the bore;
    d. actuation means, attached to the exterior of the frame and operably connected to the exterior covering means and the interior blocking means, for positioning the exterior covering means and the interior blocking means concurrently at one of their deployed positions and their stowed positions; and
    e. prevention means attached to the frame proximate the actuation means for preventing an accidental deployment of the thrust reverser, wherein the prevention means interacts with the actuation means to allow it to position the exterior covering means and the interior blocking means at their deployed positions only when a hydraulic system pressure supplied to the prevention means is proximate an elevated level produced by the hydraulic system subsequent an airplane carrying the thrust reverser landing.

2. The cascade thrust reverser of claim 1 wherein the elevated hydraulic system pressure needed for the prevention means to allow the actuation means to position the exterior covering means and the interior blocking means at their deployed positions is about 2,400 psi.

3. The cascade thrust reverser of claim 1 wherein the elevated hydraulic system pressure needed for the prevention means to allow the actuation means to position the exterior covering means and the interior blocking means at their deployed positions is about 400 psi greater than a hydraulic system pressure produced when the airplane is cruising.

4. A cascade thrust reverser for jet engines comprising:
    a. a frame defining an axial bore and holding a pair of opposed cascades extending from the bore through to an exterior of the frame;
    b. exterior covering means attached to the exterior of the frame for being positionable at one of a stowed position covering the cascades from the outside and a deployed position uncovering the cascades;
    c. interior blocking means disposed in the bore for being positionable at one of a stowed position covering the cascades from inside the bore and a deployed position concurrently uncovering the cascades and blocking the bore; and
    d. actuation means, attached to the exterior of the frame and operably connected to the exterior covering means and the interior blocking means, for positioning the exterior covering means and the interior blocking means concurrently at one of their deployed positions and their stowed positions.

5. The cascade thrust reverser of claim 4 further comprising prevention means attached to the frame proximate the actuation means for preventing an accidental deployment of the thrust reverser, wherein the prevention means interacts with the actuation means to allow it to position the exterior covering means and the interior blocking means at their deployed positions only when a hydraulic system pressure supplied to the prevention means is proximate an elevated level produced by the hydraulic system subsequent an airplane carrying the thrust reverser landing.

6. The cascade thrust reverser of claim 4 wherein when the exterior covering means and the interior blocking means are at their respective stowed positions, the bore and the exterior are substantially aerodynamically clean, whereby any engine exhaust traveling down the bore and any ambient air passing over the exterior are substantially unimpeded.

7. The cascade thrust reverser of claim 4 further comprising feedback means operably coupled to the actuation means for providing feedback to a throttle control, wherein the feedback relates to whether the exterior covering means and the interior blocking means are concurrently in their deployed positions or their stowed positions, whereby the throttle mechanism throttles down, if necessary, when the exterior covering means and the interior blocking means are positioned at their stowed positions by the actuation means subsequent landing.

8. A cascade thrust reverser for jet engines comprising:
   a. a frame defining an axial bore and holding a pair of opposed cascades extending from the bore through to an exterior of the frame;
   b. exterior covering means swingably attached to the exterior of the frame for being swingable between covering the cascades from the outside and uncovering the cascades;
   c. interior blocking means pivotally disposed in the bore for being pivotable between covering the cascades from inside the bore and concurrently uncovering the cascades and blocking the bore; and
   d. actuation means attached to the exterior of the frame and operably connected to the exterior covering means and the interior blocking means for concurrently pivoting and swinging the interior blocking means and the exterior covering means, respectively, between covering the cascades and uncovering the cascades concurrently with blocking the bore.

9. The cascade thrust reverser of claim 8 further comprising prevention means operably connected to the actuation means for preventing an accidental deployment of the thrust reverser, wherein the prevention means interacts with the actuation means to allow it to swing and pivot the exterior covering means and the interior blocking means, respectively, to uncover the cascades concurrently with blocking the bore only when a hydraulic system pressure supplied to the prevention means is proximate an elevated level produced by the hydraulic system subsequent an airplane carrying the thrust reverser landing.

10. A cascade thrust reverser for jet engines comprising:
   a. a frame having an exterior and defining an axial through-bore;
   b. first and second cascades held by the frame across the bore from one another and defining a first radial axis, wherein the cascades provide a conduit through the frame;
   c. first and second actuation mechanisms lying parallel to one another and attached to the exterior of the frame, wherein the actuation mechanisms define a second radial axis substantially perpendicular to the first radial axis;
   d. first and second cascade doors swingably connected to the exterior of the frame and further connected to the actuation mechanisms for being positioned thereby at one of a stowed position, wherein outer sides of the cascades are covered by the cascade doors, and a deployed position, wherein the cascades are uncovered; and
   e. first and second blocker doors disposed in the bore and connected to the actuation mechanisms through the frame for being pivotally positioned thereby at one of a stowed position, wherein the first and second blocker doors cover the first and second cascades, respectively, from inside the bore, and a deployed position, wherein the cascades are uncovered and the blocker doors meet to substantially block the frame bore;
   f. wherein the actuation mechanisms are configured, when actuated together, to concurrently position the blocker doors and the cascade doors at one of their respective stowed and deployed positions, whereby when the cascade doors and blocker doors are concurrently in their stowed positions, the bore is unblocked and the cascades are covered, with any exhaust traveling down the bore passing freely there through, and when the cascade doors and blocker doors are concurrently in their deployed positions, the bore is blocked and the cascades are uncovered, with any engine exhaust traveling down the bore being redirected by the blocker doors towards and through the cascades.

11. The cascade thrust reverser of claim 10 wherein the cascades each comprise a fixed array of slats angled towards a fore end of the frame, whereby when the thrust reverser is attached to an aft end of a jet engine and the actuation mechanisms have been actuated to position the cascade doors and the blocker doors at their respective deployed positions, engine exhaust is redirected by the blocker doors and through the cascades, which further redirect the exhaust towards the fore of the engine via the angled slats.

12. The cascade thrust reverser of claim 10 wherein:
   a. the thrust reverser further comprises outer nacelle paneling attached to the exterior of the frame and defining openings over the outer sides of the cascades; and
   b. the cascade doors are dimensioned to snugly fit in the openings defined by the outer nacelle paneling, thereby covering the outer sides of the cascades and providing a substantially aerodynamically clean outer surface when the cascades doors are in their stowed positions.

13. The cascade thrust reverser of claim 10 wherein:
   a. an interior of the frame defines an aft-facing, circumferential stop shoulder; and
   b. the blocker doors, when in their stowed position, fit up against the stop shoulder; whereby engine exhaust can pass through the bore substantially aerodynamically undisturbed.

14. The cascade thrust reverser of claim 10 further comprising a lock mechanism, attached to the exterior of the frame proximate the first actuation mechanism, wherein the lock mechanism is actuable to position a lock pawl at one of a locking position, wherein the lock pawl interacts with the first actuation mechanism to prevent it from actuating, and an unlocked position, wherein the lock pawl does not prevent the first actuation mechanism from actuating.

15. The cascade thrust reverser of claim 14 wherein the lock mechanism is hydraulically powered and is configured to automatically actuate to position the lock pawl at its unlocked position only when the hydraulic pressure of an airplane's hydraulic system supplied to the lock mechanism is proximate an elevated level produced by the hydraulic system subsequent the airplane landing.

16. The cascade thrust reverser of claim 15 wherein:
   a. the actuation mechanisms are hydraulically powered and hydraulically connected in parallel; and
   b. the lock mechanism is hydraulically connected in series with the actuation mechanisms, whereby the actuation mechanisms can only be hydraulically powered to position the cascade doors and blocker doors at their respective deployed positions subsequent the lock mechanism automatically actuating to position the lock pawl at its unlocked position when the hydraulic pressure of the airplane's hydraulic system is proximate the elevated level produced by the hydraulic system subsequent landing.

17. The cascade thrust reverser of claim 14 wherein both actuation mechanisms have a lock mechanism associated therewith.

18. The cascade thrust reverser of claim 10 wherein:
   a. the actuation mechanisms each comprise:
      i. a generally cylindrical hinge shaft assembly extending through the frame to the bore and having a first end external to the frame and a second end lying proximate the frame bore;
      ii. an inner lever coupled to the hinge shaft assembly proximate the first end;
      iii. an outer lever coupled to the hinge shaft assembly proximate the first end; and
      iv. a hydraulically moveable traverse beam pivotally connected at one end to a first push/pull rod in turn pivotally connected to the inner lever, and the traverse beam pivotally connected at the other end to a second push/pull rod in turn pivotally connected to the outer lever;
   b. the blocker doors are connected to the hinge shaft assemblies; and
   c. the cascade doors are connected to the inner and outer levers;
whereby when the traverse beam is hydraulically actuated, the inner lever pivots about the hinge shaft assembly in one rotary direction and the outer lever pivots about the hinge shaft assembly in the other rotary direction, thereby swinging the cascade doors, and thereby concurrently pivoting the blocker doors.

19. The cascade thrust reverser of claim 18 wherein:
   a. each actuation mechanism further comprises a support guide slidably supporting the traverse beam, and extending laterally away from the hinge shaft assembly;
   b. each hinge shaft assembly comprises:
      i. an axially hollow outer shaft;
      ii. an inner shaft partially nested within the outer shaft; and
      iii. support apparatus for independently rotatably supporting the inner shaft and the outer shaft;
   c. in each actuation mechanism, the inner lever is affixed to the inner shaft such that the inner lever and the inner shaft rotate in conjunction, and the outer lever is affixed to the outer shaft such that the outer lever and the outer shaft rotate in conjunction; and
   d. the blocker doors, each having a first end and a second end, are connected at the first end to one of the inner shaft and the outer shaft of the first actuation mechanism, and at the second end to one of the inner shaft and the outer shaft of the second actuation mechanism, whereby each blocker door is pivotally supported in the bore between the two actuation mechanisms, and whereby when the traverse beam is caused to slide along the support guide, thereby rotating the inner and outer levers and the inner and outer shafts connected respectively thereto, the blocker doors, connected to the inner and outer shafts, pivot.

20. The cascade thrust reverser of claim 10 wherein the cascade doors are each swingably connected to the frame and the actuation mechanisms via two swing arm assemblies.

21. The cascade thrust reverser of claim 10 wherein:
   a. the first cascade door is swingably connected to the exterior of the frame via two swing arm assemblies respectively affixed to the frame at either side of the first cascade and further respectively affixed to the first cascade door at either bottom side thereof;
   b. the second cascade door is swingably connected to the exterior of the frame via two swing arm assemblies respectively affixed to the frame at either side of the second cascade and further respectively affixed to the second cascade door at either bottom side thereof; and
   c. the cascade doors are connected to the actuation mechanisms via a first one of each cascade door's swing arm assemblies being further connected to the first actuation mechanism, and a second one of each cascade door's swing arm assemblies being further connected to the second actuation mechanism.

22. The cascade thrust reverser of claim 21 wherein the swing arm assemblies each comprise:
   a. a swing arm bracket attached to the frame;
   b. an aft swing arm pivotally connected at a first end to a first end of the swing arm bracket, and pivotally connected at a second end to its respective cascade door; and
   c. a fore swing arm comprising a long arm portion connected to a lever arm portion, the lever arm portion extending generally laterally away from the long arm portion and forming a shoulder therewith, and the fore swing arm being pivotally connected at the shoulder to a second end of the swing arm bracket, and a free end of the long arm portion being pivotally connected to the respective cascade door, and a free end of the lever arm portion being pivotally connected to a short push/pull rod further connected to a respective one of the actuation mechanisms.

23. A cascade thrust reverser for jet engines having a pair of cascades and a first covering means for covering the cascades from an interior side thereof and a second covering means for covering an exterior side of the cascades, wherein the thrust reverser is actuable to concurrently move the first and second covering means to one of a stowed position, wherein the cascades are covered, and a deployed position, wherein the cascades are uncovered and the first covering means is positioned to block a through-bore of the thrust reverser, whereby any engine exhaust traveling through the through-bore is redirected towards and through the cascades.

24. The cascade thrust reverser for jet engines of claim 23 wherein, when the first and second covering means are in the stowed position, the through-bore and an exterior surface of the thrust reverser both have substantially aerodynamically clean profiles for ensuring that engine exhaust passing through the bore and ambient air passing over the exterior surface are not substantially disturbed.

25. The cascade thrust reverser for jet engines of claim 23 wherein the thrust reverser is configured to only be able to move the first and second covering means to the deployed position when a hydraulic system pressure supplied to the thrust reverser is proximate an elevated level produced by the hydraulic system subsequent an airplane carrying the thrust reverser landing.

26. A cascade thrust reverser for jet engines comprising:
   a. a frame defining an axial through-bore and holding a pair of cascades extending from the bore to an exterior of the frame; and
   b. a pair of cascade doors swingably connected to the exterior of the frame; and
   c. a pair of blocker doors pivotally disposed in the bore;
   d. wherein the blocker doors and the cascade doors are operably connected to a pair of actuation mechanisms attached to the exterior the frame, the actuation mechanisms being actuable to concurrently position the blocker doors and the cascade doors at one of a stowed position, wherein the cascades are covered from the outside and from inside the bore, and a deployed position, wherein the cascades are uncovered and the blocker doors meet to block the bore, whereby any engine exhaust traveling through the bore is redirected by the blocker doors towards and through the cascades.

27. The cascade thrust reverser for jet engines of claim 26 further comprising a lock mechanism attached to the frame proximate a first one of the actuation mechanisms, wherein the lock mechanism interacts with the actuation means to allow it to concurrently position the blocker doors and the cascade doors at the deployed position only when a hydraulic system pressure supplied to the lock mechanism is proximate an elevated level produced by the hydraulic system subsequent an airplane carrying the thrust reverser landing.

28. A cascade thrust reverser for jet engines comprising:
   a. a frame defining an axial bore and holding a pair of opposed cascades extending from the bore through to an exterior of the frame;
   b. a pair of cascade doors swingably connected to the exterior of the frame for being moveable to one of a stowed position, wherein the cascades are covered from the outside, and a deployed position, wherein the cascades are uncovered;
   c. a pair of blocker doors pivotally disposed in the bore for being pivotable to one of a stowed position, wherein the cascades are covered from inside the bore, and a deployed position, wherein the cascades are uncovered and the blocker doors meet to block the bore; and
   d. a pair of actuation mechanisms attached to the exterior of the frame and operably connected to the blocker doors through the frame and to the cascade doors, wherein the actuation mechanisms are configured, when actuated together, to concurrently pivot the blocker doors and swing the cascade doors, whereby when the blocker doors and the cascade doors are held concurrently in their stowed positions by the actuation mechanisms any engine exhaust traveling down the bore passes through substantially unimpeded and any ambient air passing over the exterior of the frame does so substantially without aerodynamic interference from the cascades, and whereby when the blocker doors and the cascades are moved to their deployed positions by the actuation mechanisms any engine exhaust traveling down the bore is redirected by the blocker doors towards and through the cascades, which further help to redirect the exhaust.

29. A cascade thrust reverser for jet engines comprising:
   a. a frame defining an axial bore and holding first and second opposed cascades respectively extending from the bore through to first and second exterior regions of the frame;
   b. a first actuation mechanism attached to a third exterior region of the frame between the cascades, and a second actuation mechanism attached to a fourth exterior region of the frame between the cascades;
   c. a first cascade door swingably attached to the frame proximate the first exterior region and actually connected to the actuation mechanisms for being positioned at one of a stowed position, wherein an exterior side of the first cascade is covered, and a deployed position, wherein the exterior side of the first cascade is uncovered;
   d. a second cascade door swingably attached to the frame proximate the second exterior region and actually connected to the actuation mechanisms for being swing to one of a stowed position, wherein an exterior side of the second cascade is covered, and a deployed position, wherein the exterior side of the second cascade is uncovered;
   e. first and second blocker doors disposed in the bore and supported between and operably connected to the actuation mechanisms through the frame for being pivoted thereby to one of a stowed position, wherein interior sides of the first and second cascades are covered, and a deployed position, wherein the interior sides of the cascades are uncovered and the first and second blocker doors meet to block the bore and thereby redirect any engine exhaust traveling through the bore to the cascades;
   f. wherein the actuation mechanisms are configured to pivot the blocker doors concurrently with swinging the cascade doors.

30. A swing arm assembly for a cascade thrust reverser comprising:
   a. a swing arm bracket for facilitating attachment of the swing arm assembly to a thrust reverser frame;
   b. an aft swing arm pivotally connected at a first end to a first end of the swing arm bracket; and
   c. a fore swing arm comprising a long arm portion connected to a lever arm portion, the lever arm portion extending generally laterally away from the long arm portion and forming a shoulder therewith, and the fore swing arm being pivotally connected at the shoulder to a second end of the swing arm bracket.

31. An actuation mechanism for a thrust reverser comprising:
   a. a generally cylindrical hinge shaft assembly comprising:
      i. an axially hollow outer shaft;
      ii. an inner shaft partially nested within the outer shaft; and
      iii. support apparatus for independently rotatably supporting the inner shaft and the outer shaft;
   b. an inner lever affixed to the inner shaft such that the inner lever and the inner shaft rotate in conjunction;
   c. an outer lever affixed to the outer shaft such that the outer lever and the outer shaft rotate in conjunction; and
   d. a traverse beam slidably supported in a support guide extending laterally away from the hinge shaft assembly, wherein the traverse beam is pivotally connected at one end to a first push/pull rod in turn pivotally connected to the inner lever, and the traverse beam is pivotally connected at the other end to a second push/pull rod in turn pivotally connected to the outer lever;

e. wherein when the traverse beam is slid along the support guide, the attached inner lever and inner shaft rotate in one rotary direction, and the attached outer lever and outer shaft rotate in the other rotary direction.

* * * * *

UNITED STATES PATENT AND TRADEMARK OFFICE
CERTIFICATE OF CORRECTION

PATENT NO.    : 6,311,928 B1
DATED         : November 6, 2001
INVENTOR(S)   : Walter M. Presz, Jr. et al.

It is certified that error appears in the above-identified patent and that said Letters Patent is hereby corrected as shown below:

<u>Column 5,</u>
Line 2, change "trust" to read -- thrust --.

<u>Column 22,</u>
Line 18, change "actually" to read -- actuably --.

Signed and Sealed this

Ninth Day of April, 2002

Attest:

JAMES E. ROGAN
*Attesting Officer*   *Director of the United States Patent and Trademark Office*